(12) United States Patent
Ishii

(10) Patent No.: US 11,100,831 B2
(45) Date of Patent: Aug. 24, 2021

(54) IMAGE DISPLAY APPARATUS AND IMAGE DISPLAY METHOD

(71) Applicant: MAXELL, LTD., Kyoto (JP)

(72) Inventor: Toshiki Ishii, Tokyo (JP)

(73) Assignee: MAXELL, LTD., Kyoto (JP)

( * ) Notice: Subject to any disclaimer, the term of this patent is extended or adjusted under 35 U.S.C. 154(b) by 39 days.

(21) Appl. No.: 16/473,257

(22) PCT Filed: Dec. 26, 2016

(86) PCT No.: PCT/JP2016/088644
§ 371 (c)(1),
(2) Date: Jun. 25, 2019

(87) PCT Pub. No.: WO2018/122902
PCT Pub. Date: Jul. 5, 2018

(65) Prior Publication Data
US 2020/0152105 A1    May 14, 2020

(51) Int. Cl.
*G09G 3/02* (2006.01)
*G02B 27/00* (2006.01)
(Continued)

(52) U.S. Cl.
CPC ........... *G09G 3/025* (2013.01); *G02B 26/103* (2013.01); *G02B 27/0093* (2013.01);
(Continued)

(58) Field of Classification Search
CPC ...... G09G 3/025; G09G 5/00; G09G 2320/08; G09G 2340/0407; G09G 2354/00;
(Continued)

(56) References Cited

U.S. PATENT DOCUMENTS

2005/0248852 A1   11/2005  Yamasaki
2009/0316116 A1*  12/2009  Melville .................. A61B 1/07
                                                       353/31
(Continued)

FOREIGN PATENT DOCUMENTS

JP     11-084306 A     3/1999
JP   2001-281594 A    10/2001
(Continued)

OTHER PUBLICATIONS

International Search Report of PCT/JP2016/088644 dated Mar. 7, 2017.

*Primary Examiner* — David Tung
(74) *Attorney, Agent, or Firm* — Mattingly & Malur, PC

(57) ABSTRACT

The image display apparatus generates a driving control signal for generating image light on the basis of an image signal, and allows an image projector to generate the image light to form a pixel on a screen in accordance with a modulation timing by performing modulation driving for a light source, and to generate the image light so as to scan the screen while a light emission direction of the image light changes by performing scan driving, allows a gaze-direction detector to detect a gaze direction of a user, and allows a projection-direction driver to change a projection direction of the image light in accordance with the gaze direction. In the first mode, the image display apparatus controls modulation driving and scan driving so that a configuration of a pixel region on the screen changes from a relatively high pixel density region to a relatively low pixel density region.

16 Claims, 29 Drawing Sheets

(51) Int. Cl.
*G02B 26/10* (2006.01)
*G02B 27/01* (2006.01)
*G02B 26/08* (2006.01)
*G09F 9/00* (2006.01)
*G09G 5/00* (2006.01)

(52) U.S. Cl.
CPC ..... *G02B 27/0172* (2013.01); *G02B 27/0179* (2013.01); *G02B 2027/0178* (2013.01); *G02B 2027/0187* (2013.01); *G09G 2320/08* (2013.01); *G09G 2340/0407* (2013.01); *G09G 2354/00* (2013.01)

(58) Field of Classification Search
CPC .............. G02B 26/103; G02B 26/0833; G02B 27/0172; G02B 26/0179; G02B 27/0093; G02B 2027/0178; G02B 2027/0187; G02B 2027/0147; G09F 9/00
See application file for complete search history.

(56) References Cited

U.S. PATENT DOCUMENTS

| | | |
|---|---|---|
| 2015/0268415 A1 | 9/2015 | Schowengerdt et al. |
| 2016/0328884 A1* | 11/2016 | Schowengerdt ..... G02B 27/017 |
| 2017/0041577 A1* | 2/2017 | Nishimura ......... A61B 1/00172 |

FOREIGN PATENT DOCUMENTS

| | | |
|---|---|---|
| JP | 2005-348382 A | 12/2005 |
| JP | 2016-038484 A | 3/2016 |
| JP | 2016-507077 A | 3/2016 |

* cited by examiner

1: HOUSING
3: IC CHIP
4: CURVED MIRROR
103: IMAGE PROJECTOR
105: PROJECTION-DIRECTION DRIVER
106: GAZE-DIRECTION DETECTOR
a1 TO a3: IMAGE LIGHT
D1: GAZE DIRECTION (FRONT SIDE)

FIG. 8
SCAN DRIVING SCAN SIGNAL
(A) SCAN SIGNAL IN Y DIRECTION
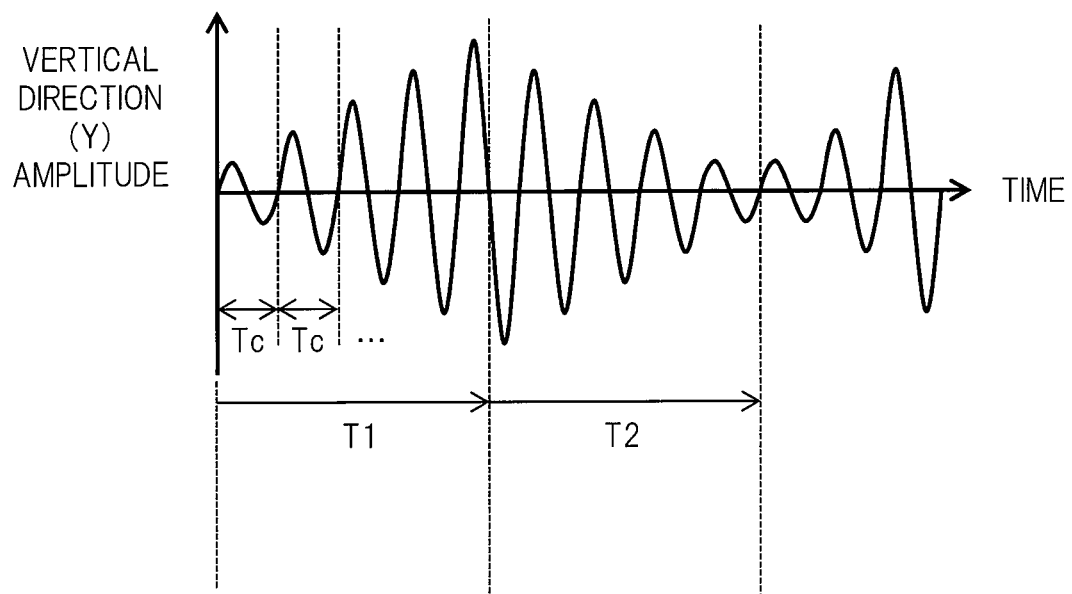
(B) SCAN SIGNAL IN X DIRECTION
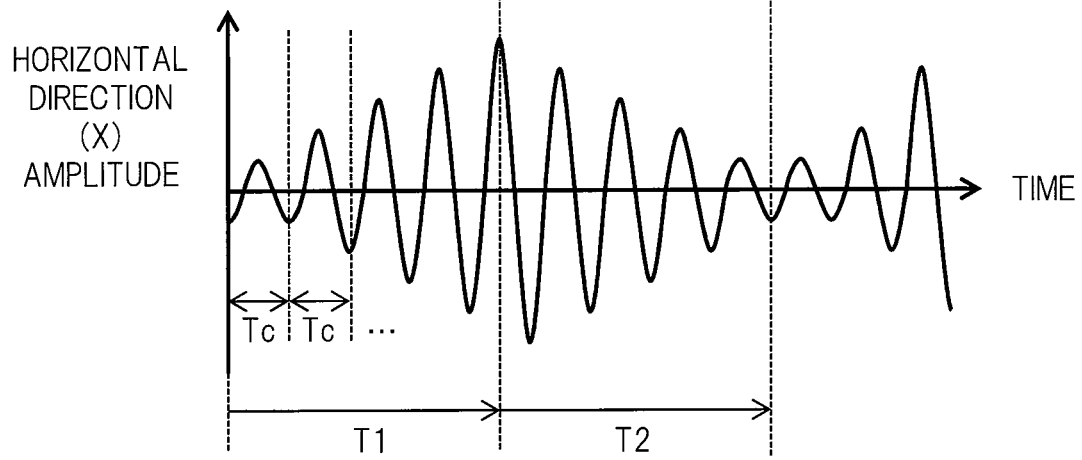

FIRST MODE PIXEL CONFIGURATION

|  | PIXEL DENSITY (RESOLUTION) | SCAN SPEED | MODULATION SPEED | NUMBER OF PIXELS | PIXEL-ARRANGEMENT INTERVAL |
|---|---|---|---|---|---|
| INNER CIRCLE | HIGH | SLOW | CONSTANT | CONSTANT | NARROW |
| OUTER CIRCLE | LOW | FAST | CONSTANT | CONSTANT | WIDE |

SECOND MODE  PIXEL CONFIGURATION

|  | PIXEL DENSITY (RESOLUTION) | SCAN SPEED | MODULATION SPEED | NUMBER OF PIXELS | PIXEL-ARRANGEMENT INTERVAL |
|---|---|---|---|---|---|
| INNER CIRCLE | CONSTANT | SLOW | SLOW | SMALL | CONSTANT |
| OUTER CIRCLE | CONSTANT | FAST | FAST | LARGE | CONSTANT |

FIG. 11
MODULATION DRIVING (MODULATION TIMING CONTROL)
(A) FIRST MODE   MODULATION SIGNAL (FIXED TIMING)
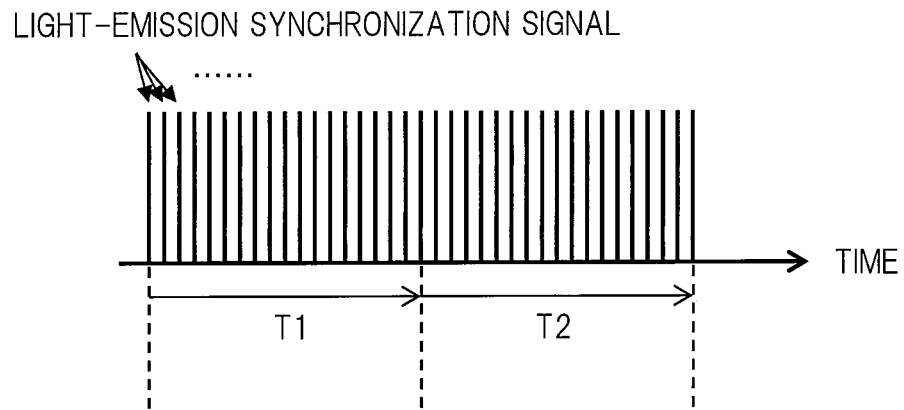
(B) SECOND MODE   MODULATION SIGNAL (VARIABLE TIMING)
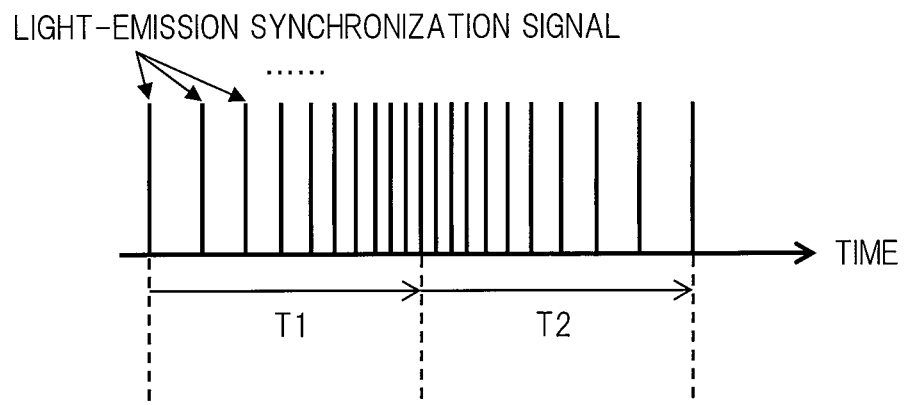

DISTRIBUTION OF RETINAL PHOTORECEPTOR CELLS OUTLINE

FIG. 14
MODIFICATION EXAMPLE   FIRST MODE   PIXEL CONFIGURATION
(A) MODULATION DRIVING
MODULATION TIMING CONTROL
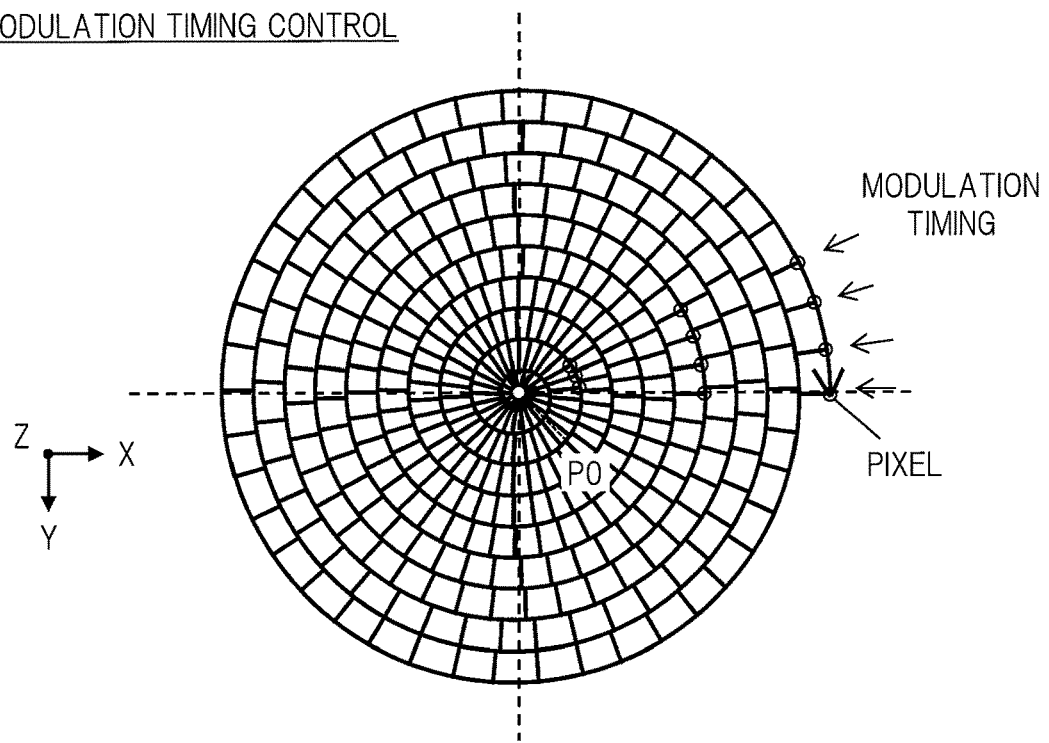
(B) SCAN DRIVING
AMPLITUDE CONTROL
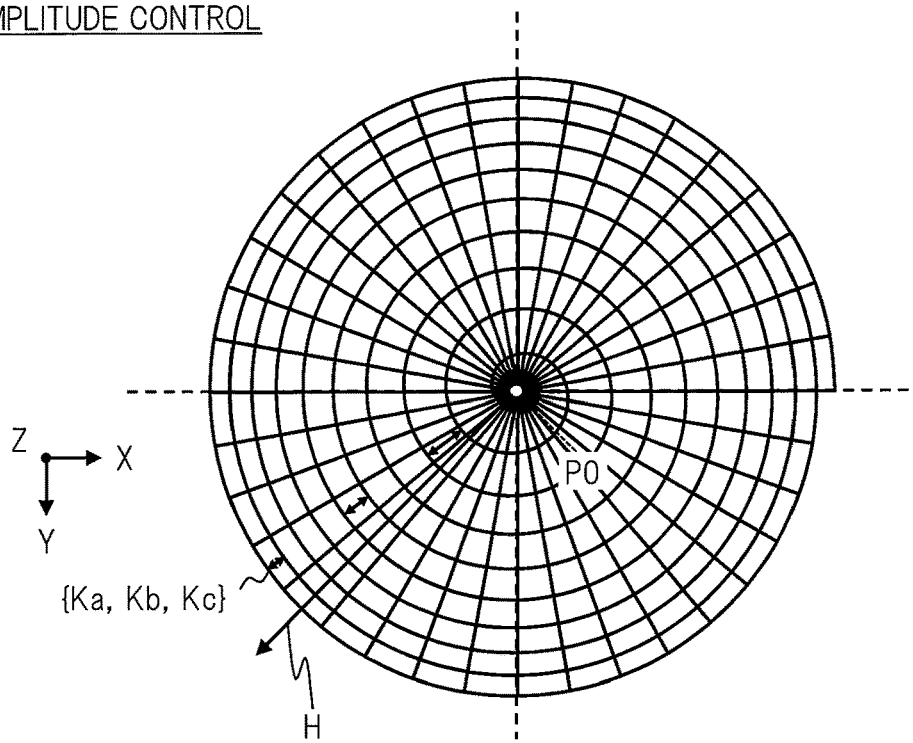

FIG. 15
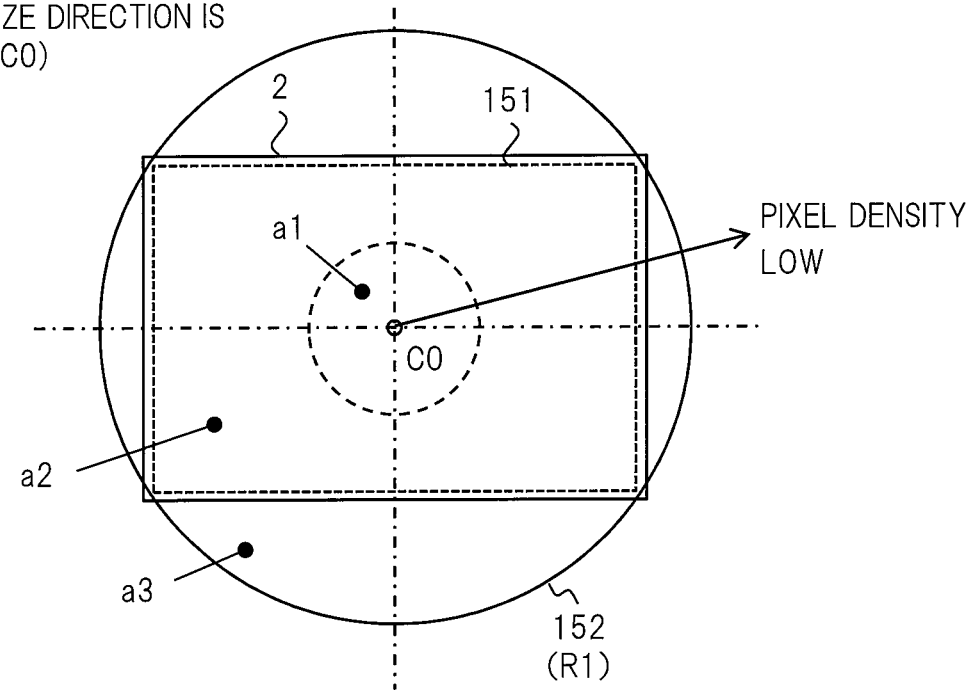
(A) FIRST MODE
(WHEN GAZE DIRECTION IS AT POINT C0)
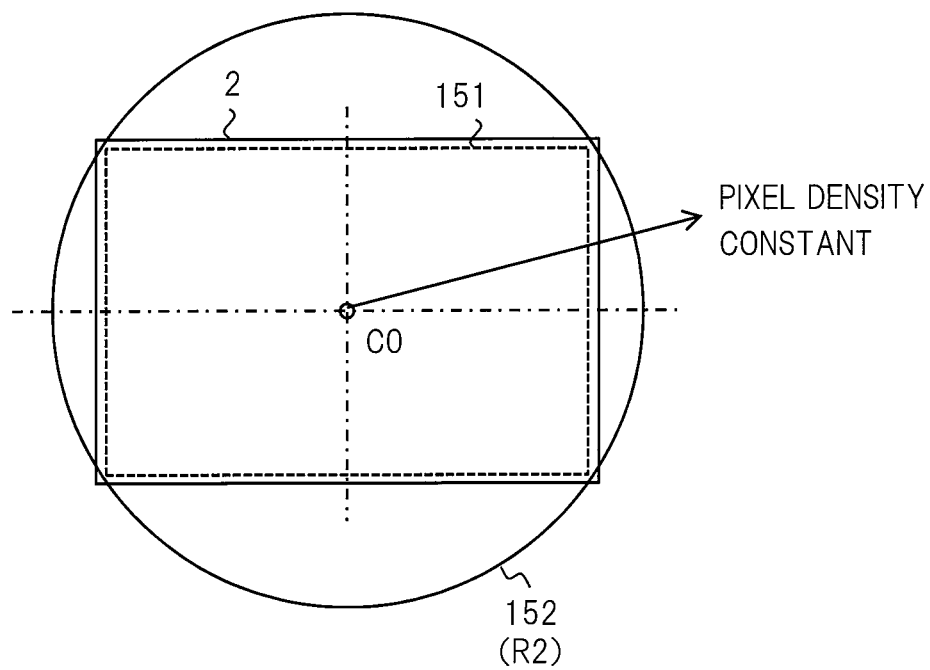
(B) SECOND MODE

MODIFICATION EXAMPLE FIRST MODE PIXEL REGION

FIG. 19
MODIFICATION EXAMPLE FIRST MODE PIXEL REGION
(A) GAZE DIRECTION CENTER
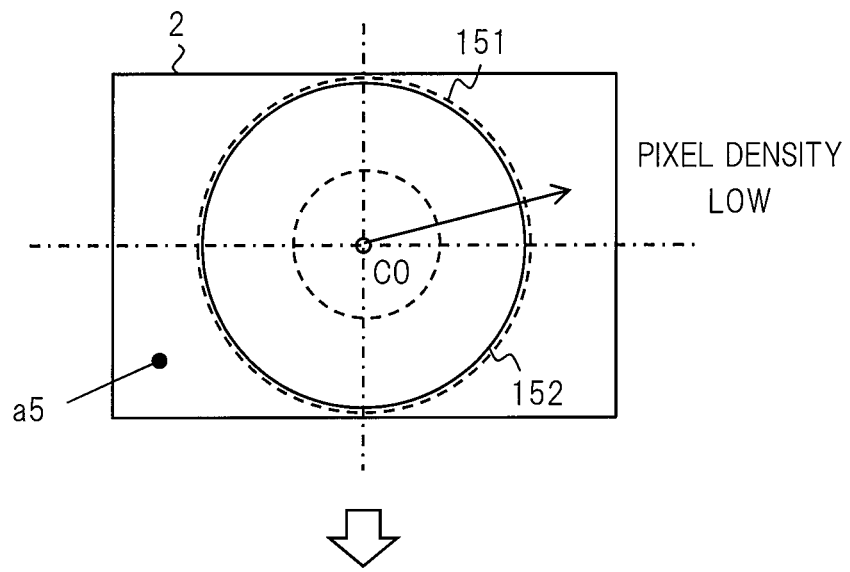
(B) GAZE DIRECTION CHANGE
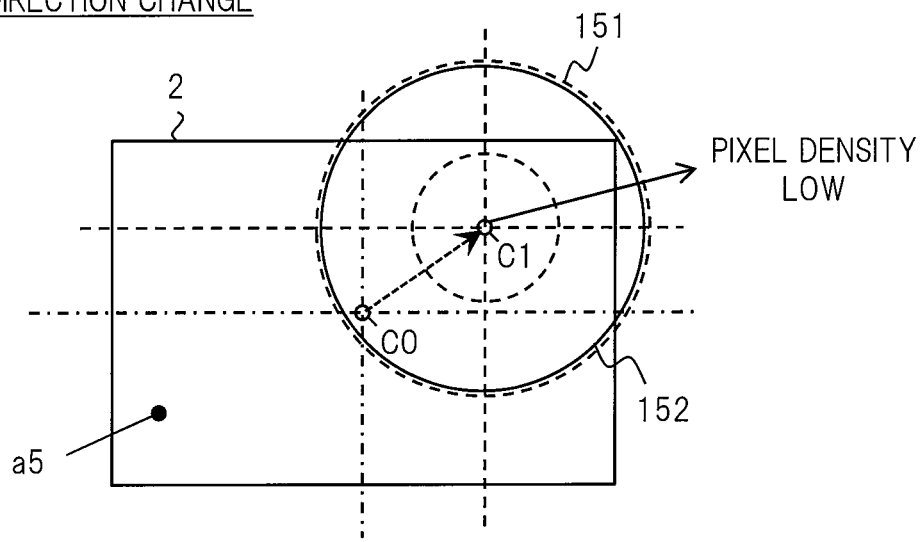

SECOND EMBODIMENT FIRST MODE

FIG. 26
FOURTH EMBODIMENT
(A) FIRST MODE
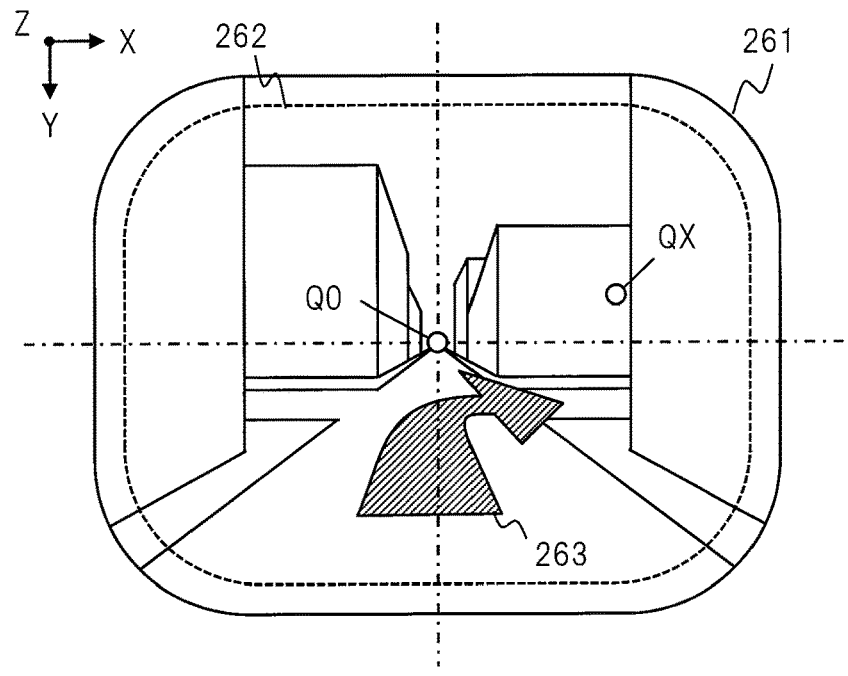
(B) SECOND MODE
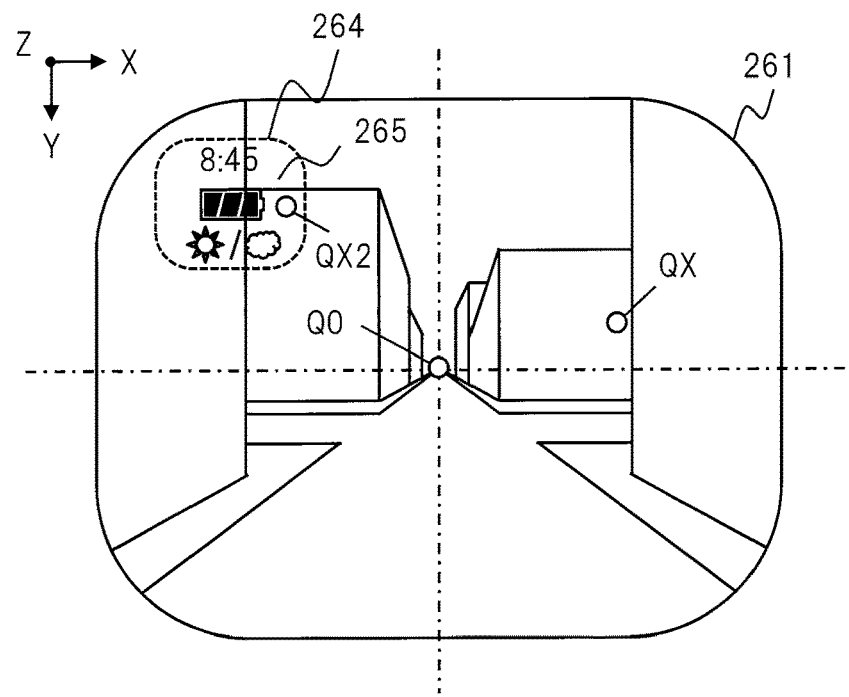

FIG. 28
FIFTH EMBODIMENT
(A) FIRST MODE
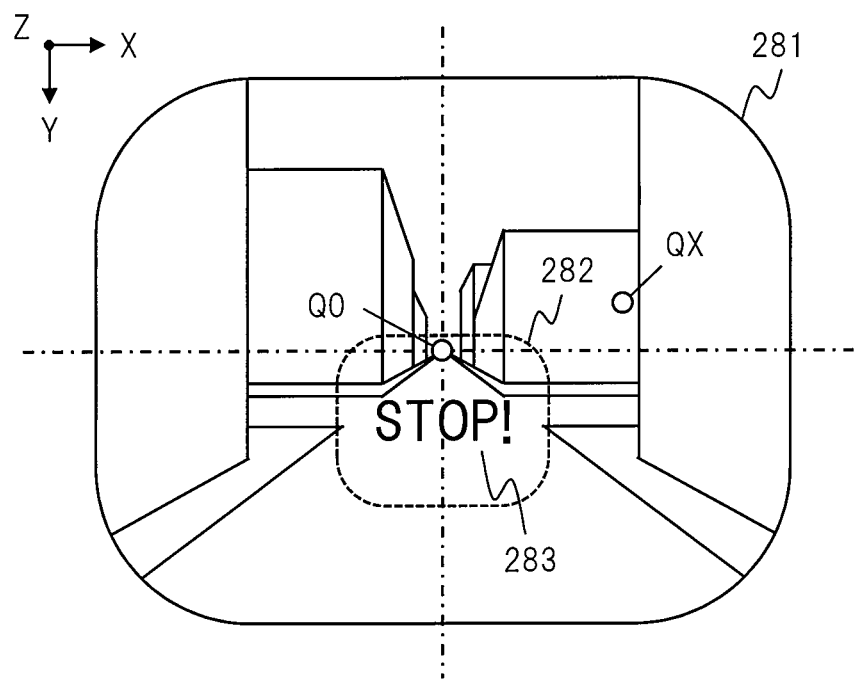
(B) SECOND MODE
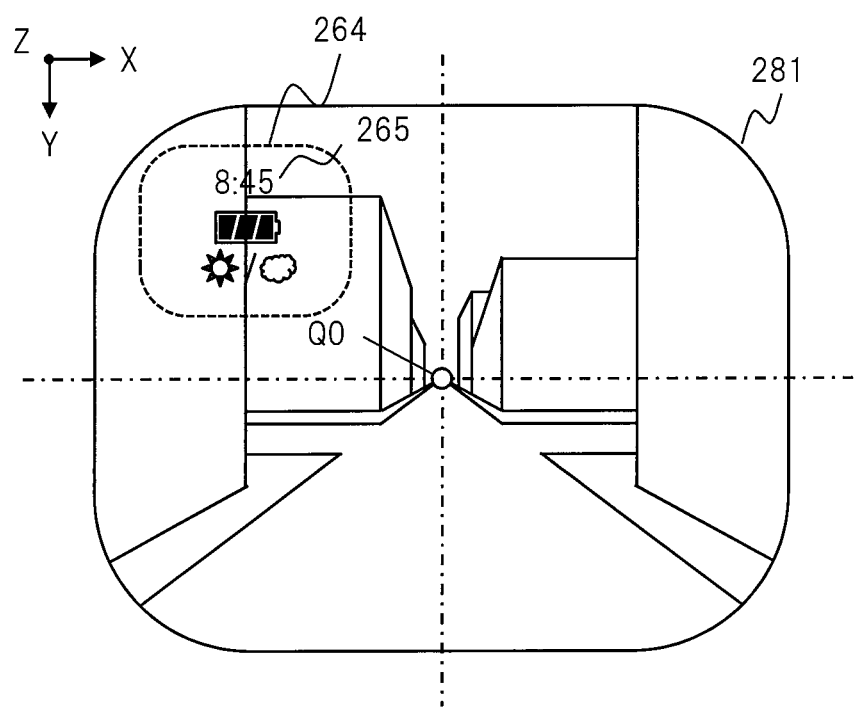

IMAGE DISPLAY APPARATUS AND IMAGE DISPLAY METHOD

TECHNICAL FIELD

The present invention relates to an image display technique for displaying images including motion images and still images. And, the present invention relates to a head-mounted type display apparatus.

BACKGROUND ART

In recent years, as image display apparatuses, head-mounted type display apparatuses each of which is generally called a head mounted display (HMD: Head Mounted Display), a smart glass and others have been commercialized. This image display apparatus has, for example, eyeglasses shape, and is mounted on a head of and in front of eyes of a user. This image display apparatus has, for example, a display device such as a liquid crystal display device (LCD) generating images and an optical system projecting light from the display device onto a screen. Information based on the images is presented to a field of view of a user to achieve virtual reality (VR: Virtual Reality), augmented reality (AR: Augmented Reality) or others. Types of the screen of each of these image display apparatuses include a transparent type and a non-transparent type. In the case of the transparent type, the screen is made of, for example, a half mirror or others so that images of external environment are transparently displayed while projected images are overlapped and displayed. In the case of the non-transparent type, the images of external environment are not displayed on the screen.

In order to improve visibility and sense of immersion in the image display apparatus, techniques for achieving higher resolution, techniques for achieving a wider visual angle, and others have been developed. Note that the visual angle indicates such a range as causing the displayed contents to be correctly watched in the display device.

As a related art example of the image display apparatuses, Japanese Patent Application Laid-Open Publication No. H11-84306 (Patent Document 1) is cited. The Patent Document 1 describes the following points as an image observation apparatus that can observe high-definition images with a wide visual angle. The head mounted type display apparatus has two liquid crystal display devices (LCD). The images showing a wide range are displayed on a first LCD while the images showing a partial region are displayed on a second LCD. The image light of both LCD is composed by the half mirror and is guided to the eyes. The high definition of the images of the partial region is achieved by increasing the resolution of the second LCD. The high definition of an observer's gazing point is always achieved by changing the images of the second LCD in accordance with orientation of observer's eyeballs.

RELATED ART DOCUMENT

Patent Document

Patent Document 1: Japanese Patent Application Laid-Open Publication No. H11-84306

SUMMARY OF THE INVENTION

Problems to be Solved by the Invention

In a head mounted type display apparatus that is an image display apparatus of a related art such as the Patent Document 1, it is attempted to achieve image display with the wide visual angle and image display with high resolution in the partial region of the center of the field of view. For this purpose, the image display apparatus includes a first display device with a low resolution in a wide range and a second display device with a high resolution in a relative narrow range so that the images of the first display device and the second display device are composed with each other by the optical system and are projected and displayed on the screen. An image display apparatus having such a configuration needs to have two display devices or others in order to achieve this function. Therefore, the image display apparatus has problems such as a higher cost, a larger apparatus size, and higher power consumption than those in a case of a configuration achieving this function by usage of one display device.

An object of the present invention is to provide a technique related to an image display apparatus and a head mounted type display apparatus such as HMD, the technique capable of achieving the images with the high resolution in the wide visual angle and the center of the field of view at a low cost, a small apparatus size, and low power consumption.

Means for Solving the Problems

A typical embodiment of the present invention is an image display apparatus, and has a feature providing the following configurations.

An image display apparatus of one embodiment includes: a controller configured to control image projection on a screen; a circuit unit configured to generate a modulation signal for modulation driving and a scan signal for scan driving as driving control signals for generating image light on the basis of an image signal; an image projector configured to generate the image light so as to form a pixel in accordance with a modulation timing on the screen by the modulation driving for a light source on the basis of the modulation signal and generate the image light so as to scan the screen while changing a light emission direction of the image light by the scan driving on the basis of the scan signal; a gaze-direction detector configured to detect a user's gaze direction on the screen; and a driver configured to perform driving so as to change a projection direction of the image light in accordance with the gaze direction, the controller controls, in a first mode of the image projection, the modulation driving and the scan driving so that a configuration of a pixel region on the screen changes from a relatively high pixel region to a relatively low pixel region in a direction from a center point of the pixel region to an outside, and controls the projection direction of the image light so that the center point is matched with a position in the screen, the position corresponding to the gaze direction.

Effects of the Invention

According to a typical embodiment of the present invention, regarding an image display apparatus such as HMD and a head mounted type display apparatus, images with high resolution at a wide visual angle and a center of visual field can be achieved at a low cost, a small apparatus size, and low power consumption.

BRIEF DESCRIPTIONS OF THE DRAWINGS

FIG. 8 is a diagram showing a scan signal of the scan driving in the first embodiment;

FIG. 11 is a diagram showing a modulation signal of modulation driving in the first embodiment;

FIG. 14 is a diagram showing the pixel configuration of the first mode in a modification example of the first embodiment;

FIG. 15 is a diagram showing relation between a screen and a pixel region in the first embodiment;

FIG. 19 is a diagram showing the pixel region of the first mode in a modification example of the first embodiment;

FIG. 26 is a diagram showing a display example of a first mode and a second mode in an image display apparatus of a fourth embodiment of the present invention;

FIG. 28 is a diagram showing a display example of a first mode and a second mode in an image display apparatus of a fifth embodiment of the present invention.

BEST MODE FOR CARRYING OUT THE INVENTION

Hereinafter, embodiments of the present invention will be described in detail on the basis of the accompanying drawings. Note that the same components are denoted by the same reference symbols throughout all the drawings for describing the embodiments in principle, and the repetitive description thereof will be omitted.

First Embodiment

With reference to FIGS. 1 to 19, a head mounted type display apparatus that is an image display apparatus of a first embodiment of the present invention will be described. An image display method of the first embodiment is a method having steps executed in the image display apparatus of the first embodiment.

[Image Display Apparatus (Head Mounted Type Display Apparatus)]

Figure 1:
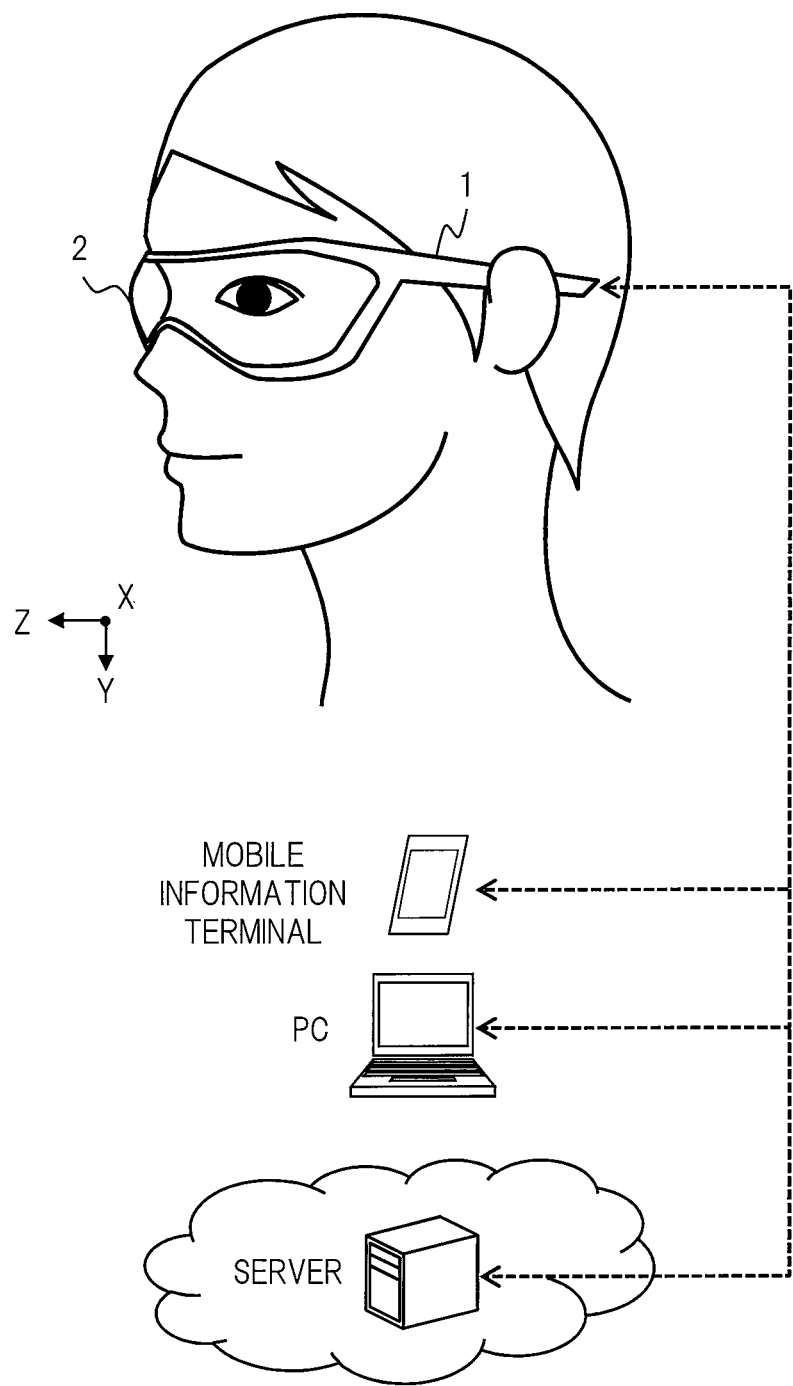
FIG. 1 is a diagram showing an outer appearance configuration obtained in mounting of a head mounted type display apparatus that is an image display apparatus of a first embodiment of the present invention.

FIG. 1 shows an outer appearance configuration in a state in which the head mounted type display apparatus that is the image display apparatus of the first embodiment is mounted on a head and in front of eyes of a user. The image display apparatus of the first embodiment is an eyeglasses-type head mounted type display apparatus having an eyeglasses shape as the outer appearance. The image display apparatus has a housing 1 and a screen 2. The housing 1 is made of, for example, an eyeglasses-shaped frame. The screen 2 is made of a translucent plate arranged in front of the eyes of the user, such as an eyeglasses lens-shaped curved mirror. The user can watch the image displayed on the screen 2 while mounting this image display apparatus on his/her head. The screen 2 of the image display apparatus of the first embodiment is of a light transmission type. An image of external environment is transparently displayed on the light-transmission type screen 2, and the image information is displayed to overlap on the image. The image is formed and presented on eyes through the screen 2.

Note that (X, Y, Z) is indicated as a direction and a coordinate system for explanation. An "X" direction that is a first direction is set to a horizontal direction in the screen, a "Y" direction that is a second direction is set to a perpendicular direction (vertical direction in FIG. 1) in the screen, and a "Z" direction that is a third direction is a direction perpendicular to the X direction and the Y direction. The Z direction corresponds to a direction in which the eyes of the user watch the screen 2 in front of the user or others.

As an image display apparatus of a modification example, note that the type is not limited to the eyeglasses type, and any type is applicable as long as it is a head mounted type. As an image display apparatus having a larger size than those of other types, such a goggle type as fixing the apparatus to a rear head by using a band or others and such a helmet type as mounting the apparatus on entire head are also applicable. As an image display apparatus having a smaller size than those of other types, such a type as mounting the apparatus on only either right or left side of the head to present the images only to one eye is also applicable. And, such a simple head mounted type display apparatus as arranging a screen of a mobile information terminal such as a smartphone at a portion in front of the eyes through a head mounted tool is also applicable. The screen of the mobile information terminal is a non-transparent screen made of a liquid crystal display apparatus, an organic EL display apparatus or others. Not only an image display apparatus presenting the information to the user by using the images but also an image display apparatus presenting information to the user by using audio, vibration or others are also applicable.

[Image Display System]

A configuration example of an image display system configured to include the image display apparatus of the first embodiment in FIG. 1 will be described as follows.

(1)

A first image display system is made of a single image display apparatus. Inside the image display apparatus (an information storage 109 in FIG. 2), an image signal of predetermined image data is previously stored. The image display apparatus (a controller 101 and an image generator 102 in FIG. 2) generates the images by using the image signal of the image data. Alternatively, the image display apparatus generates the image signal by itself if needed, and generates the images by using this image signal. In these manners, the images are presented to the field of view of the user. In this configuration, external communication does not occur, and therefore, a usage location of the image display apparatus is not limited.

(2)

A second image display system is configured so that the image display apparatus and an external apparatus are connected to each other in communication to operate in union with each other. As the external apparatus, a PC, a mobile information terminal and others are cited. The image display apparatus (a communicating unit 108 in FIG. 2) communicates transmission/reception of the information and the image signal with the external apparatus. To the image display apparatus, for example, the image signal stored in the external apparatus is input from the external apparatus. When the image display apparatus generates the image signal by itself, it can allow the external apparatus to perform a part of processing having a high calculation load. The image display apparatus transmits the information or a calculation request to the external apparatus, and receives the image signal generated by the calculation of the external apparatus. In this configuration, a processing performance of the image display apparatus (the controller 101 and the image generator 102) can be relatively lower than that of the external apparatus. Therefore, the image display apparatus can be relatively inexpensively configured. In this configuration, complicated image processing can be also achieved by using the high processing performance of the external apparatus.

(3)

In a third image display system, the image display apparatus is connected to a server in communication through a communication network such as the Internet. The server may be achieved by cloud computing. The image display apparatus (the communicating unit 108 in FIG. 2) has a communication interface for the communication network. In this configuration, the image display apparatus receives the information, the image data or others from the server, and generates the image by using the image signal based on the information, the image data or others. The image display apparatus can allow the server to perform a part of the calculation processing. A case of this configuration achieves such an operation as reflecting various pieces of information on the Internet onto the images presented to the user in real time.

The respective image display systems can be also combined with one another in its configuration. In a case of the combined configuration, the systems are configured so that the system to be used can be selected by switching in accordance with a state or a user setting.

[Functional Block Configuration]

Figure 2:
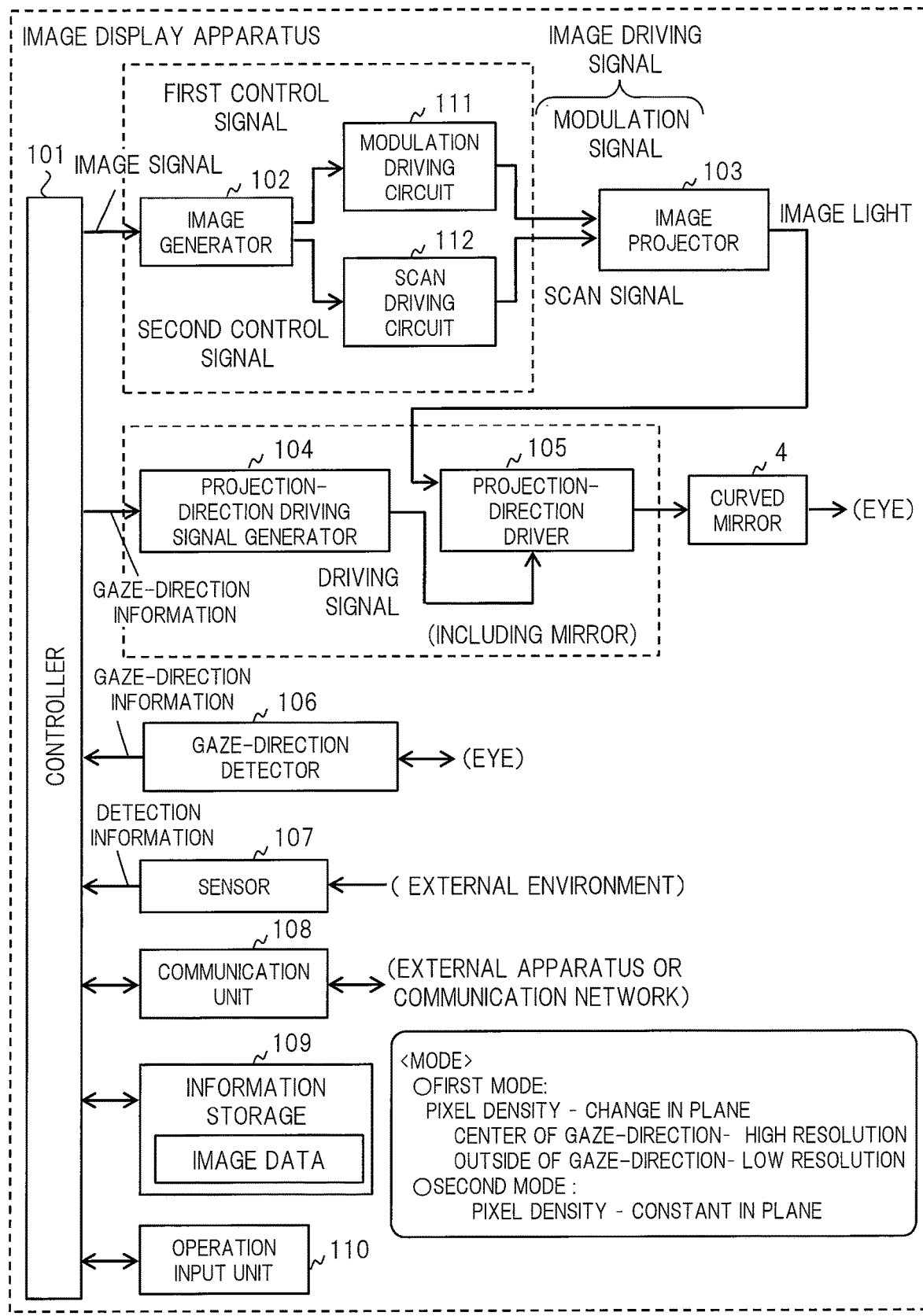
FIG. 2 is a diagram showing a functional block configuration of the image display apparatus of the first embodiment.

FIG. 2 shows a functional block configuration of the image display apparatus of the first embodiment. The image display apparatus includes a controller 101, an image generator 102, an image projector 103, an image-direction driving signal generator 104, a projection-direction driver 105, a gaze-direction detector 106, a sensor 107, a communicating unit 108, an information storage 109, an operational input unit 110, a scan driving circuit 111, a modulation driving circuit 112, a curved mirror 4 and others.

The controller 101 controls entire and each component of the image display apparatus. As a mounting example, components such as the controller 101, the image generator 102 and the image-direction driving signal generator 104 are mounted on an IC chip (an IC chip 3 in FIG. 3). The IC chip has a processor, a memory and others.

The controller 101 allows the communicating unit 108 to operate to receive the image signal from the external apparatus and take input of this. The communicating unit 108 is a device having a predetermined communication interface. The communication interface of the communicating unit 108 may be wired or wireless. The controller 101 tentatively stores the input image signal as the image data into the information storage 109, and transfers it from the information storage 109 to the image generator 102.

Alternatively, the controller 101 may directly transfer the input image signal to the image generator 102. The controller 101 may output the information to the external apparatus through the communicating unit 108. The image display apparatus may use not only the image signal from the outside but also an image signal of inside. For example, the controller 101 may use the image signal based on the image data previously stored in the information storage 109, or generate the image signal by performing the processing by itself. For example, the controller 101 may execute a processing based on an application program of the AR or others to generate the image signal for the AR or others. The controller 101 may use a program previously stored in the information storage 109, or acquire the program from the outside through communication.

The controller 101 transmits an image signal of a display target to the image generator 102. The image generator 102 converts the image signal into an image driving signal matched with the characteristics of the image projector 103, and transmits the image signal to the image projector 103. More specifically, the image driving signals include the modulation signal and the scan signal. A stage later than the image generator 102 and earlier than the image projector 103 has the modulation driving circuit 111 and the scan driving circuit 112. These components are controlled so as to operate in synchronization with each other on the basis of a control signal from the controller 101 or the image generator 102. The image generator 102 generates a first control signal and a second control signal for the control of the driving synchronization between the modulation driving circuit 111 and the scan driving circuit 112. The image generator 102 supplies the first control signal to the modulation driving circuit 111, and supplies the second control signal to the scan driving circuit 112.

The modulation driving circuit 111 generates the modulation signal on the basis of the first control signal, and supplies the signal to the image projector 103. The modulation signal is a signal for controlling the modulation driving of the image projector 103. More specifically, on the basis of the modulation signal, intensity modulation of a light source described later (in FIG. 6) inside the image projector 103 is controlled.

The scan driving circuit 112 generates the scan signal on the basis of the second control signal, and supplies the signal to the image projector 103. The scan signal is a signal for controlling the scan driving of the image projector 103. More specifically, on the basis of the scan signal, a scan trace generated by a piezoelectric element and an optical fiber described later (in FIG. 6) inside the image projector 103 is controlled.

The image projector 103 performs the modulation driving and the scan driving on the basis of the modulation signal and the scan signal that are the image driving signals, and generates and emits the image light. The emitted image light "a1" is projected on the eyes of the user through a mirror of the projection-direction driver 105 making the optical system and the curved mirror 4 making the screen 2. In the manner, the image is formed on the eyes of the user.

The gaze-direction detector 106 has a function of detecting and tracking the gaze direction of the user. The gaze-direction detector 106 can be configured by a publicly-known technique, and is also called eye tracker or others. The gaze-direction detector 106 transmits the gaze-direction information containing the detected gaze direction to the controller 101. As one configuration example, the gaze-direction detector 106 projects the near-infrared rays onto the eyes of the user to forma reflection point on a cornea, takes images of the reflection point and a pupil, and calculates the gaze direction based on a relation between them. To the gaze-direction detector 106, for example, an electrooculography method, a search coil method and others in additional to this method are also applicable. The electrooculography method is a method of detecting the gaze direction by using a potential difference between the cornea and the retina. The search coil method is a method of detecting the gaze direction by using a contact lens in which a coil is embedded. To the gaze-direction detector 106, any method capable of detecting the gaze direction is applicable.

To the projection-direction driving signal generator 104, the controller 101 transmits the gaze-direction information received from the gaze-direction detector 106. The projection-direction driving signal generator 104 generates the driving signal for controlling the projection direction of the image light (a direction in which the image light enters the eyes). On the basis of the gaze-direction information, the projection-direction driving signal generator 104 generates the driving signal matched with the characteristics of the projection-direction driver 105, and supplies the signal to the projection-direction driver 105.

Figure 3:
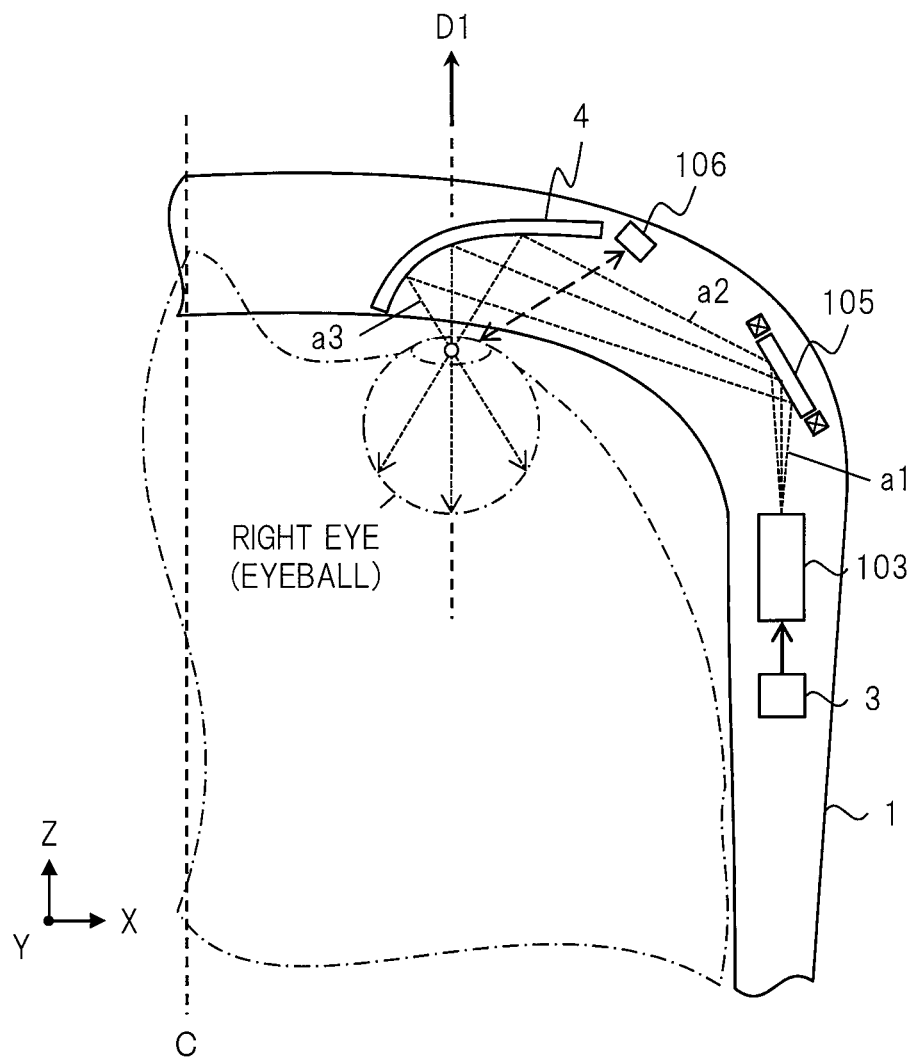
FIG. 3 is a diagram showing a configuration of components on a right half portion of a housing and a case in which a gaze direction is toward a front side in the first embodiment.

In accordance with the driving signal, the projection-direction driver 105 performs the driving for controlling the projection direction of the image light a1 from the image projector 103. In the manner, a direction of the center of the image to be projected on the screen 2 is changed. The projection-direction driver 105 configures a part of the optical system. In the first embodiment, as shown in FIG. 3, the projection-direction driver 105 is configured to have a mirror whose reflection direction is variable and an actuator changing the reflection direction of the mirror. The image light "a2" reflected by the mirror of the projection-direction driver 105 goes toward the curved mirror 4.

Although specifically described later, the projection-direction driving signal generator 104 controls the change of the projection direction so that the center of the image (pixel region) is matched with a gaze-direction center position. When the image visual angle (range in which the pixel is formed and displayed) is narrow, if the user changes the gaze direction, the image is difficult to be watched or cannot be watched by the change. In the image display apparatus of the first embodiment, at a first mode described later, the projection direction is controlled so that the image center is matched with the gaze direction as described above. In the manner, the user can always watch the image with the high resolution in front of the gaze direction at the first mode, and easily recognize the image.

The curved mirror 4 is arranged in front of the eyes, and configures the screen 2 and a part of the optical system. The curved mirror 4 reflects the image light a2 from the projection-direction driver 105 toward the eyes as shown in FIG. 3. The image light a2 reflected by the curved mirror 4 is caused to enter the eyes, and forms the image on the retina.

The sensor 107 includes a publicly-known sensor group. Sensor examples of the sensor 107 include a GPS receiver, an acceleration sensor, a gyroscope sensor, an illuminance sensor, a microphone and others. The sensor 107 detects the information of the external environment by using such a sensor, and outputs the detection information to the controller 101. In accordance with the detection information of the sensor 107, the controller 101 controls the image display apparatus. In accordance with the detection information, the controller 101 may control it so as to change the information supplied to the image generator 102 or the projection-direction driving signal generator 104. In the manner, the image information with higher interactive performance can be presented. The control examples using the detection information include switching of the display image information, a mode described later and others in accordance with positional coordinates, an acceleration rate, an angular velocity, illuminance, an audio level of the external environment or others.

The operational input unit 110 has a button or others for user input operation. Note that the operational input unit 110 may be unified with the housing 1, or may be achieved as a remotely-controlling device (remote controller) that is connected as a different component to the housing 1 through a wire or wireless. Alternatively, constituent components such as the controller 101 and the communicating unit 108 may be mounted on this remotely-controlling device.

[Image Display Apparatus—Hardware]

FIG. 3 shows arrangement of the constituent components or others as a hardware configuration of the image display apparatus of the first embodiment. FIG. 3 shows a configuration on an X-Z plane viewed from above in a Z direction when the image display apparatus is mounted on a head of the user as shown in FIG. 1. FIG. 3 shows a configuration of a right half side of the image display apparatus across a center line "C" in a right-and-left direction. In the first embodiment, the same constituent components as those of the right side are also arranged on a left side across the center line C so as to be symmetrical to each other in the right-and-left direction, although not illustrated in the drawings. In FIG. 3, a region drawn with a chain line indicates the head of the user. A circle of the region indicates an eyeball of a right eye, and an oval of the circle indicates a pupil. A broken line extending from the image generator 103 in the Z direction indicates the image light. Three broken lines indicate the light corresponding to the center, a right end and a left end. By the configuration in FIG. 3, the image is formed on the retina of the right eye. Also in the left configuration, the image is similarly formed on the left eye. A state of FIG. 3 shows a case in which the gaze direction of the user is toward the front side, and a gaze direction "D1" is matched with the Z direction.

The first embodiment has such an aspect as the formation of the image on both right and left eyes on both right and left sides. In this embodiment, general control for providing three-dimensional appearance to the image in a deep direction (Z direction) that extends toward a point in the front side of the eyes may be added. In this case, three-dimensional appearance in the watching can be achieved. To a modification example, such an aspect as providing the hardware constituent components as shown in FIG. 3 on not the both right and left sides but only either side may be applied. Such an aspect as sharing a part of components such as the gaze-direction detector 105 as a common component between the right and left sides may be applied.

The IC chip 3 including the controller 101 and others, the image projector 103, the projection-direction driver 105, the gaze-direction detector 106, the curved mirror 4 and others are mounted on the housing 1. Each constituent component is connected to the controller 101 of the IC chip 3 or others through a connection wire inside the housing 1. The image projector 103 generates the image light on the basis of the modulation driving and the scan driving, and emits the light in the Z direction. The image light a1 emitted from the image projector 103 is reflected so that its projection direction is controlled by the mirror of the projection-direction driver 105. The reflected image light a2 is reflected toward the right eye by the curved mirror 4. The reflected image light a3 is caused to enter the eyeball of the right eye, and forms the image on the retina.

The gaze-direction detector 106 is arranged in, for example, vicinity of the eyeball. The gaze-direction detector 106 detects the gaze direction of the right eye on the basis of a pupil state by using, for example, the above-described method. In the case of the state in FIG. 3, the gaze direction D1 is detected.

The projection-direction driver 105 is configured of the mirror configuring the optical system and the actuator driven so as to change the reflection direction of the mirror. The reflection direction is changed by the driving signal from the projection-direction driving signal generator 104.

The projection-direction driver 105 may be configured of a MEMS (Micro Electro Mechanical Systems) mirror. The projection-direction driver 105 may be configured to drive the reflection direction of the mirror by using the piezoelectric element. In addition to these configurations, the projection-direction driver 105 may be configured of any element having a function capable of bending the light direction, such as a galvanometer mirror, a voice coil motor, an ultrasonic motor, an audio optical element, an electric optical element, and a liquid crystal polarizing element.

The first embodiment is configured so that the curved mirror 4 is arranged at the point in front of the eyes as the element configuring the screen 2 and the optical system, and so that the image light is reflected toward the eyes by the curved mirror 4. The configuration is not limited to this, and, for example, the following configuration is also applicable. This is configured of a light guide plate and a holographic optical element (HOE: Holographic Optical Element) instead of the curved mirror 4. In this case, the configuration of the optical system of the housing 1 can be thinned, and therefore, enhancement of design capability and reduction of a weight of the image display apparatus can be easily achieved.

The gaze-direction detector 106 detects the gaze direction D1 in this state. On the basis of the gaze-direction information of the gaze direction D1, the controller 101 controls the reflection direction of the projection-direction driver 105. That is, the controller 101 controls the projection direction so that the center of the image light is matched with the gaze direction.

Figure 4:
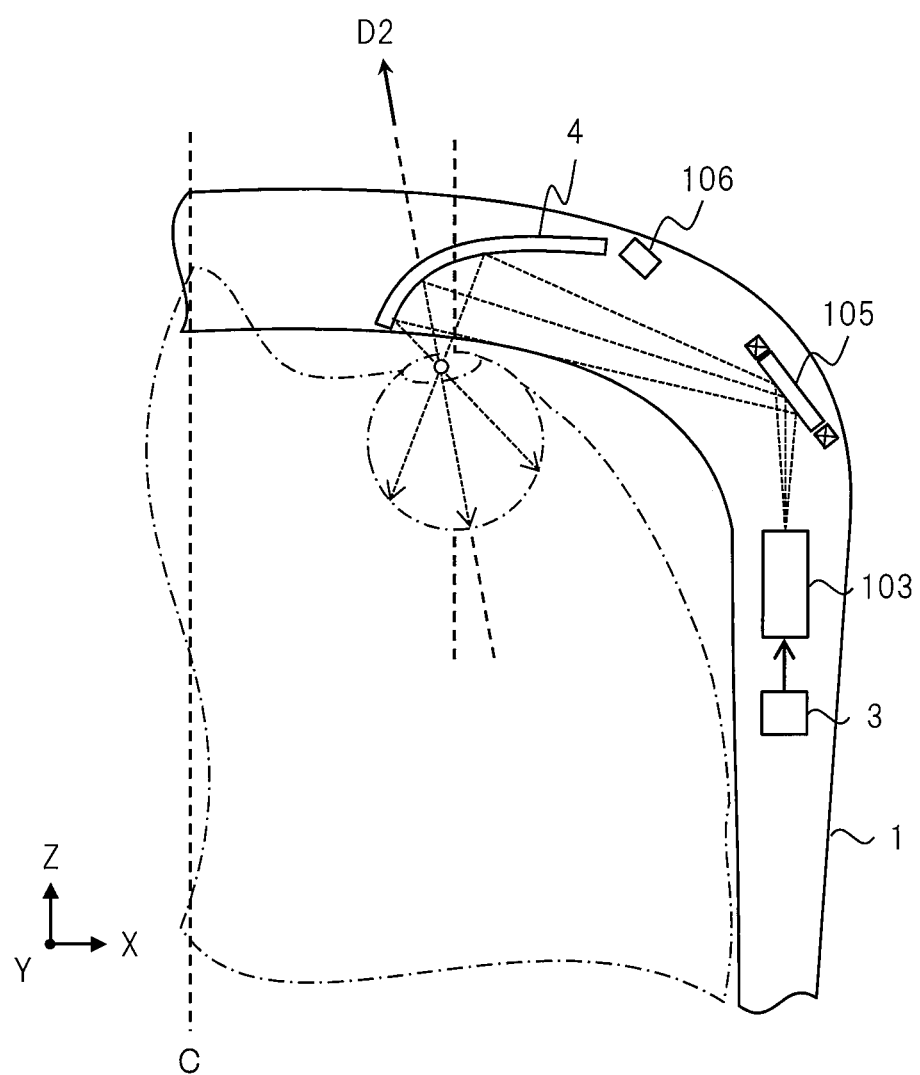
FIG. 4 is a diagram showing a configuration of components on the right half portion of the housing and a case in which the gaze direction is slightly toward a left side in the first embodiment.

FIG. 4 shows a state in which the right eye is watching a point that slightly shifts from the front side toward the left side in the same configuration as that of FIG. 3. The gaze direction of the right eye in this case is shown as a gaze direction "D2". The gaze-direction detector 106 detects the gaze direction D2 in this state. On the basis of the gaze-direction information of the gaze direction D2, the controller 101 controls the reflection direction of the projection-direction driver 105. In the manner, the projection direction is controlled so that the center of the image light emitted from the image projector 103 is matched with the center of the retina of the eyeball of the right eye or others.

Figure 5:
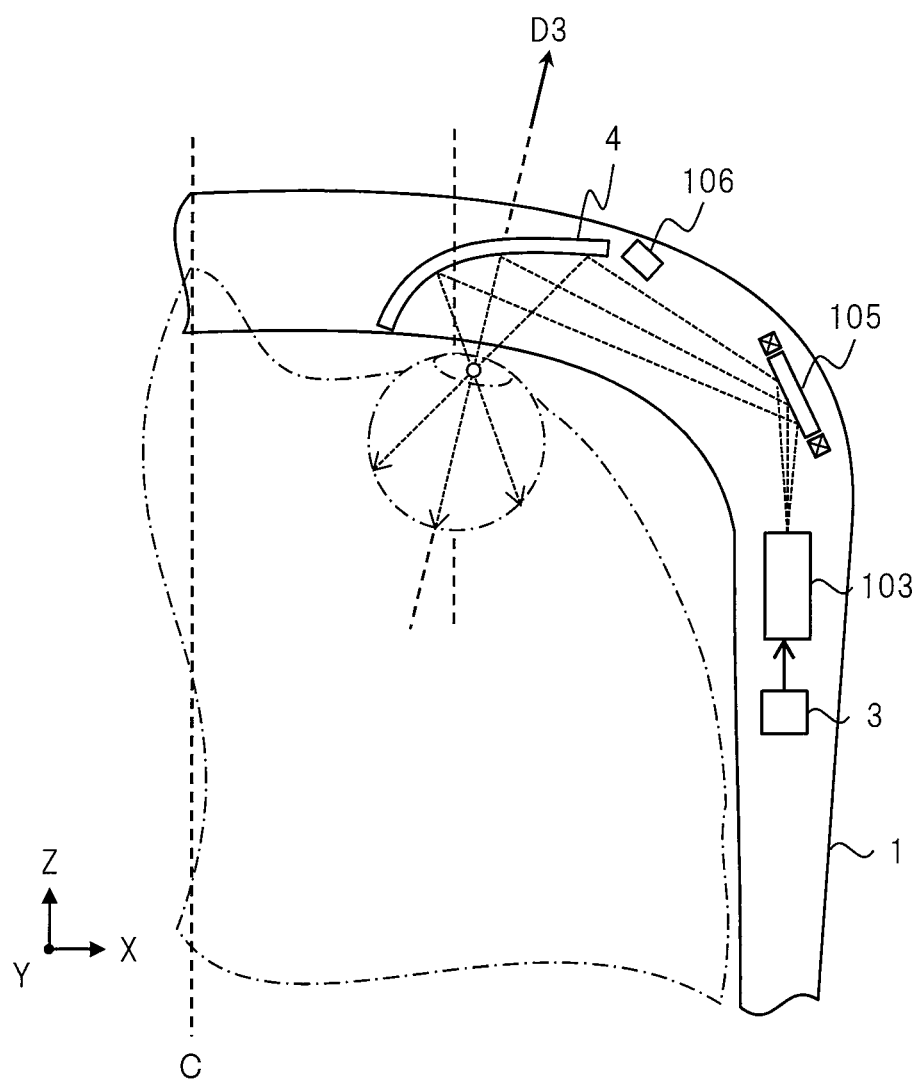
FIG. 5 is a diagram showing a configuration of components on the right half portion of the housing and a case in which the gaze direction is slightly toward a right side in the first embodiment.

FIG. 5 shows a state in which the right eye is watching a point that slightly shifts from the front side toward the right side in the same configuration as that of FIG. 3. The gaze direction of the right eye in this case is shown as a gaze direction "D3". The gaze-direction detector 106 detects the gaze direction D3 in this state. On the basis of the gaze-direction information of the gaze direction D3, the controller 101 controls the reflection direction of the projection-direction driver 105. In the manner, the projection direction is controlled so that the center of the image light emitted from the image projector 103 is matched with the center of the retina of the eyeball of the right eye or others.

[Image Projector—Hardware]

Figure 6:
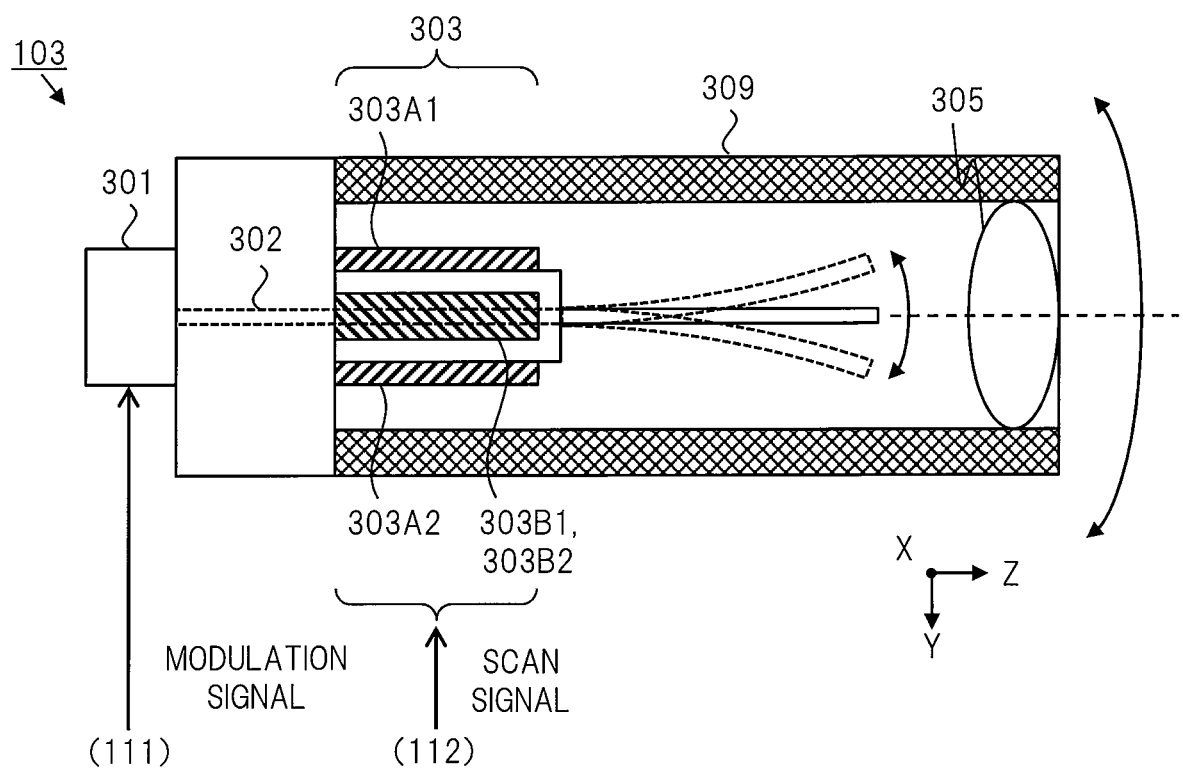
FIG. 6 is a diagram showing a component configuration of an image projector in the first embodiment.

FIG. 6 shows a structure of the image projector 103. FIG. 6 shows a configuration on a Y-Z plane on which the image projector 103 is viewed in the X direction. The image projector 103 has a light source 301, an optical fiber 302, a piezoelectric element 303 {303A1, 303A2, 303B1 and 303B2}, and a lens 305. These components are housed in a housing 309 of the image projector 103.

The light source 301 is connected to the modulation driving circuit 111, and the modulation signal from the modulation driving circuit 111 is supplied to the light source. The light source 301 is a laser light source that composes a red laser, a green laser and a blue laser and couples the laser light with the optical fiber 302 and emits the light. Each output power and timing of the three-color lasers can be controlled by the intensity modulation.

By the modulation signal, the output power and timing of the intensity modulation are controlled. In accordance with the modulation timing, pixels on the screen 2 are configured.

The piezoelectric element 303 is configured of a pair of piezoelectric elements 303A1 and 303A2 in the perpendicular direction (Y direction) and a pair of piezoelectric elements 303B1 and 303B2 in the horizontal direction (X direction). The piezoelectric element 303 has a predetermined length in the Z direction. The piezoelectric elements 303A1 and 303A2 in the perpendicular direction are arranged so as to face each other in the Y direction and sandwich the optical fiber 302 at a predetermined space. The piezoelectric elements 303B1 and 303B2 in the horizontal direction are arranged so as to face each other in the horizontal direction and sandwich the optical fiber 302 at a predetermined space. In FIG. 6, note that the piezoelectric element 303B2 is arranged at a position behind on a rear side.

The piezoelectric element 303 is configured of the piezoelectric elements each of which converts a voltage applied to a piezoelectric body into power, and is provided as an actuator that actuates the optical fiber 302. The piezoelectric element 303 is connected to the scan driving circuit 112, and is driven in accordance with the scan signal from the scan driving circuit 112. The piezoelectric element 303 can actuate the optical fiber 302 so as to deform in each of the sandwiching directions (X and Y directions) in accordance with the voltage applied by the scan signal. The piezoelectric elements 303A1 and 303A2 in the Y direction change, in the Y direction, orientation of an end of the optical fiber 302 in the Z direction as shown in the drawings. Similarly, the piezoelectric elements 303B1 and 303B2 in the X direction change, in the X direction, orientation of the end of the optical fiber 302 in the Z direction. In the manner, the directions of the image light emitted from the end of the optical fiber 302 in the Z direction along the direction can be controlled so as to perform the scanning in the X and Y directions on the screen 2.

The lens 305 is arranged at an emitting end of the image projector 103. The light emitted from the end of the optical fiber 302 in the Z direction penetrates the lens 305, and is emitted toward the projection-direction driver 105 as the image light a1. The lens 305 enlarges a scan angle of the emission light of the optical fiber 302. The enlarged scan angle covers a region with a predetermined wide visual angle.

[Scan Driving—Scan Trace]

Figure 7:
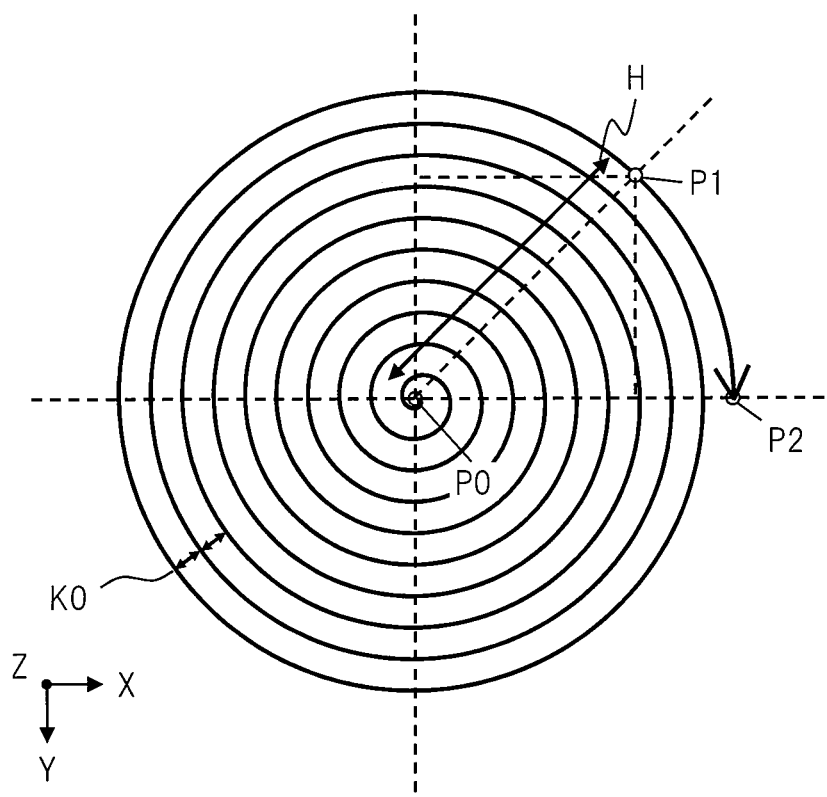
FIG. 7 is a diagram showing a scan trace of scan driving in the first embodiment.

FIG. 7 shows a scan trace and a scan direction of the scan driving on the X-Y plane as a control trace of the image projector 103. A spiral arrow line substantially having a circular shape in FIG. 7 corresponds to a trace of the end of the optical fiber 302 in FIG. 6. That is, this trace indicates the scan trace of the image light on the X-Y plane of the screen 2. This scan trace is configured by combination of the scanning in the X direction and the scanning in the Y direction. A point "P0" indicates a reference point when the scanning is not performed. On the basis of the scan driving using the piezoelectric element 303, its radius gradually changes while the end of the optical fiber 302 substantially draws the circle. The radius corresponds to amplitudes in the X direction and the Y direction. In a state at a certain moment, an end of the trace is at a point "P1". In this state, a radius "H" is a distance between the point P1 and the point "P0". This radius H is configured by combination of the amplitude of the scan signal in the X direction and the amplitude of the scan signal in the Y direction described later. For example, a scan direction in a state in which the end of the trace is at a point "P2" is a downward direction in the Y direction.

On the basis of the scan driving of the image projector 103, the scanning with the light emitted from the end of the optical fiber 302 is performed to draw the spiral shape as described above. FIG. 7 shows a case in which the scanning is performed so that the radius H is enlarged outward from the center point P0 at a constant rate. The scanning can be similarly performed so that the radius H is shrunk from the outside toward the center point P0. The scanning is performed so as to, for example, alternately repeat the scanning in the enlarging direction of the radius H and the scanning in the shrinking direction thereof. That is, the scanning is performed in the enlarging direction of the radius H in a first scan period, and then, when the radius H reaches a predetermined maximum value, the first scan period ends. In a second scan period that is next, the scanning is performed in the shrinking direction of the radius H. When the radius H reaches 0, that is, when the scanning reaches the center point P0, the second scan period ends, and then, the scanning in the enlarging direction of the radius H starts again. The invention is not limited to this scanning method, and the scanning may be repeated while the scanning is performed only in either the enlarging direction or the shrinking direction of the radius H to recover between the point P0 and the maximum value of the radius H.

In the scan control example in FIG. 7, an extent and a rate of the enlargement and the shrinkage of the radius H per time are constant, and an interval "KO" between adjacent circles in the spiral is constant. The interval KO in the scan trace is not limited to this example, and any interval is applicable (see modification examples described later).

[Scan Driving—Scan Signal]

FIG. 8 shows the scan signal of the scan driving for achieving the scanning of FIG. 7. FIG. 8(A) shows a scan signal and a control method for the amplitude in the perpendicular direction (Y direction) of the image projector 103. FIG. 8(B) shows a scan signal and a control method for the amplitude in the horizontal direction (X direction) of the image projector 103. A horizontal axis indicates the time, and a vertical axis indicates the amplitude.

In FIG. 8(A), by the scan signal in the Y direction, the piezoelectric elements 303A1 and 303A2 used for driving the end of the optical fiber 302 in the Y direction are controlled. In the manner, the amplitude in the Y direction is controlled to form a sine wave. A first scan period "T1" indicates a period in which the scanning is performed so as to enlarge the radius H outward from the center point P0 in FIG. 7 to the maximum value. A second scan period "T2" indicates a period in which the scanning is performed so as to shrink the radius H from the maximum value of the radius H to the center point P0 in FIG. 7. And, a cycle "Tc" indicates the time corresponding to one circle of the spiral in FIG. 7, and has a constant value.

In FIG. 8(B), similarly, by the scan signal in the X direction, the piezoelectric elements 303B1 and 303B2 used for driving the end of the optical fiber 302 in the X direction are controlled. In the manner, the amplitude in the X direction is controlled to form a sine wave. The scanning is controlled so as to form such a sine wave as shifting a phase of a waveform in the X direction of (B) by 90 degrees from a phase of a waveform in the Y direction of (A). In the manner, the end of the optical fiber 302 draws the spiral scan trace as shown in FIG. 7.

As described above, in the first scan period T1, by gradually increasing the amplitudes in the perpendicular and horizontal directions, the spiral scanning is achieved so as to gradually enlarge the radius H from the point P0 to the outside. Similarly, in the second scan period T2, by gradually decreasing the amplitudes in the perpendicular and horizontal directions, the spiral scanning is achieved so as to gradually shrink the radius H from the outside to the point P0.

In the waveform of the scan signal in FIG. 8, a maximum value of the amplitude is increased and decreased by a certain slope. In the manner, the interval KO of the spiral circle of the scan trace is constant as shown in FIG. 7.

[Mode]

The image display apparatus of the first embodiment controls a first mode and a second mode of the screen configuration of the screen 2 as two types of modes. The controller 101 selects and switches the first mode or the second mode in accordance with a display target image type, a user setting state, a status determination based on the detection information of the sensor 107 or others. Simply, on the basis of the user input operation, it can be determined which one of the first mode and the second mode is to be used, and the controller 101 uses the determined mode. In the user input operation, the button operation by the operational input unit 110 in FIG. 2 may be used. Alternatively, a function of detecting a specific action of the eyes of the user (such as an eyelid opening/closing action) by using the gaze-direction detector 109 to interpret the action as a command for the mode switching or others may be used.

The first mode is a mode achieving the pixel configuration fitting with the eye characteristics, that is an inconstant mode in which the pixel density and the resolution change on the screen 2. In the first mode, a region has a higher resolution having a higher pixel density while the region is closer to the gaze-direction center, and a lower resolution having a lower pixel density while the region is at a farther circumference from the gaze-direction center. When the image is displayed on the screen 2 in the first mode state, the modulation and the scanning of the image projector 103 are controlled so as to provide such a pixel configuration. In the first mode state, the gaze-direction detector 106 is controlled so that the high resolution region at the image center is matched with the gaze direction of the user at this time.

The second mode is a mode in which the pixel density and the resolution are constant on the screen 2. In the second mode state, the modulation and the scanning of the image projector 103 are controlled so as to provide such a pixel configuration.

[First Mode—Pixel Configuration]

Figure 9:
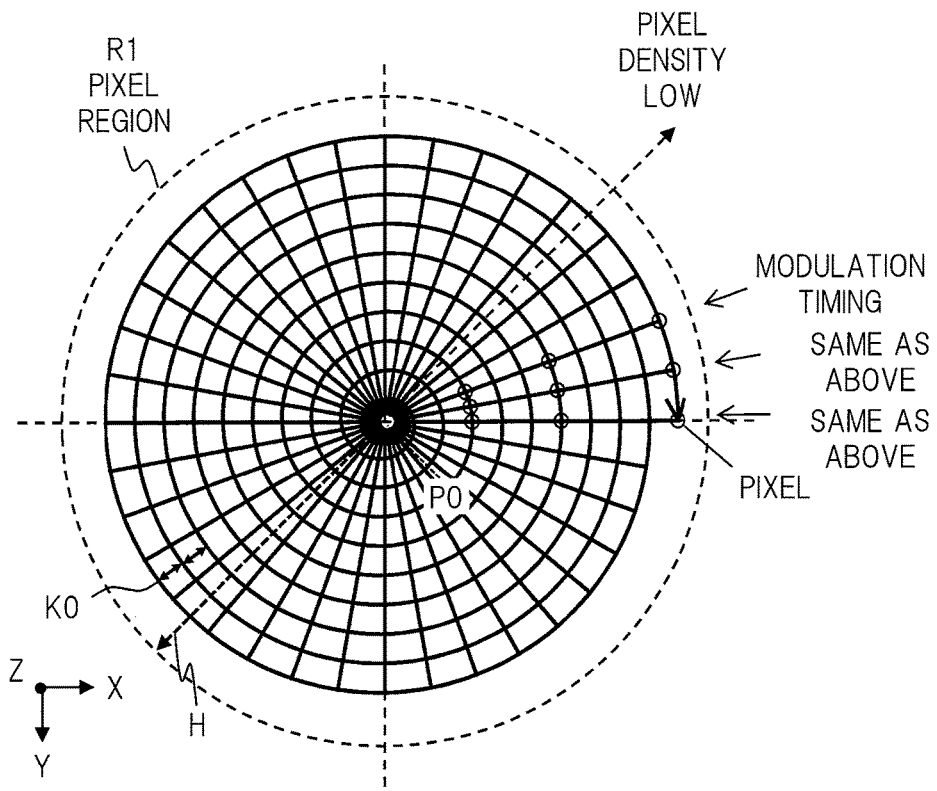
FIG. 9 is a diagram showing a pixel configuration and characteristics of a first mode in the first embodiment.

FIG. 9 shows the pixel configuration of the first mode on the X-Y plane. An upper drawing of FIG. 9 shows the pixel density on the X-Y plane and others caused when the image light from the image projector 103 is projected on the screen 2 on the basis of the scan driving in FIGS. 7 and 8. A lower drawing of FIG. 9 shows a summary table of the characteristics of the pixel configuration of the first mode. The upper drawing of FIG. 9 shows a pixel region "R1" that is a region where the pixels are formed. The pixels of the pixel region R1 are configured by the modulation driving and the scan driving.

A center point P0 of the pixel region R1 is shown. The point P0 is the same as the reference point of the scan driving in FIG. 7. The point P0 is controlled so as to be matched with the gaze direction of the user (FIGS. 3 to 5). The spiral arrow line extends outward from the point P0. This arrow line corresponds to the scan trace and the scan direction in FIG. 7. The spirally-extending line in the direction of the radius H indicates the modulation timing of the modulation driving. The modulation timing is a timing of the intensity modulation of the laser light of the light source 301 of the image projector 103. Each crossing point between the line of the scan driving in the spiral circular direction and the line of the modulation driving in the radial direction corresponds to a position at which the pixel is formed and is shown with a small circle as the pixel example.

The scan driving of the first mode is as shown in FIGS. 7 and 8. In the spiral substantial circles, the scan speed is relatively slow on an inner circle side closer to the center point P0 and relatively fast on an outer circle side. The time (the cycle Tc in FIG. 8) taken for one circle of the scanning in the first mode is constant in both the inner circle and the outer circle, regardless of the state of the radius H. A circumferential length of one circle of the scanning is relatively small in the inner circle and is relatively large in the outer circle. Therefore, the scan speed is relatively slow in the inner circle and is relatively fast in the outer circle.

In the modulation driving of the first mode, the modulation speed and the modulation timing are set to be constant in both the inner circle and the outer circle as shown in the table of the lower drawing of FIG. 9 and in FIG. 11 described later. In the first mode, the number of pixels on one circle in the circumferential direction of the scan trace is set to be constant. Therefore, the modulation speed is set to be constant in both the inner circle and the outer circle. For example, the number of the modulation timing for each circle is set to a predetermined number. The circumferential length of one circle of the scan trace is small in the inner circle and is large in the outer circle. Therefore, when the modulation timing is set to be constant, the arrangement density of the pixels in the circle is high in the inner circle and is low in the outer circle.

In the pixel configuration of the first mode, in the radius H of the spiral, the pixel density of the pixel region R1 is relatively higher in a region on the inner circle that is closer to the center point P0 and is relatively lower in a region on the outer circle having a value closer to the maximum value of the radius H. That is, in the pixel region R1, the inner circle has the higher resolution, and the outer circle has the lower resolution.

In the pixel configuration of the first mode, the number of pixels is set to be constant on both the inner circle and the outer circle in the circumferential direction of each spiral circle. In the circumferential direction of each spiral circle, an arrangement interval between the pixels is relatively narrow in the inner circle and is wide in the outer circle. In the pixel configuration of the first mode in FIG. 9, in the radial direction of the spiral, the interval KO between the adjacent circles is constant, in other words, an interval between the adjacent pixels is constant.

Figure 13:
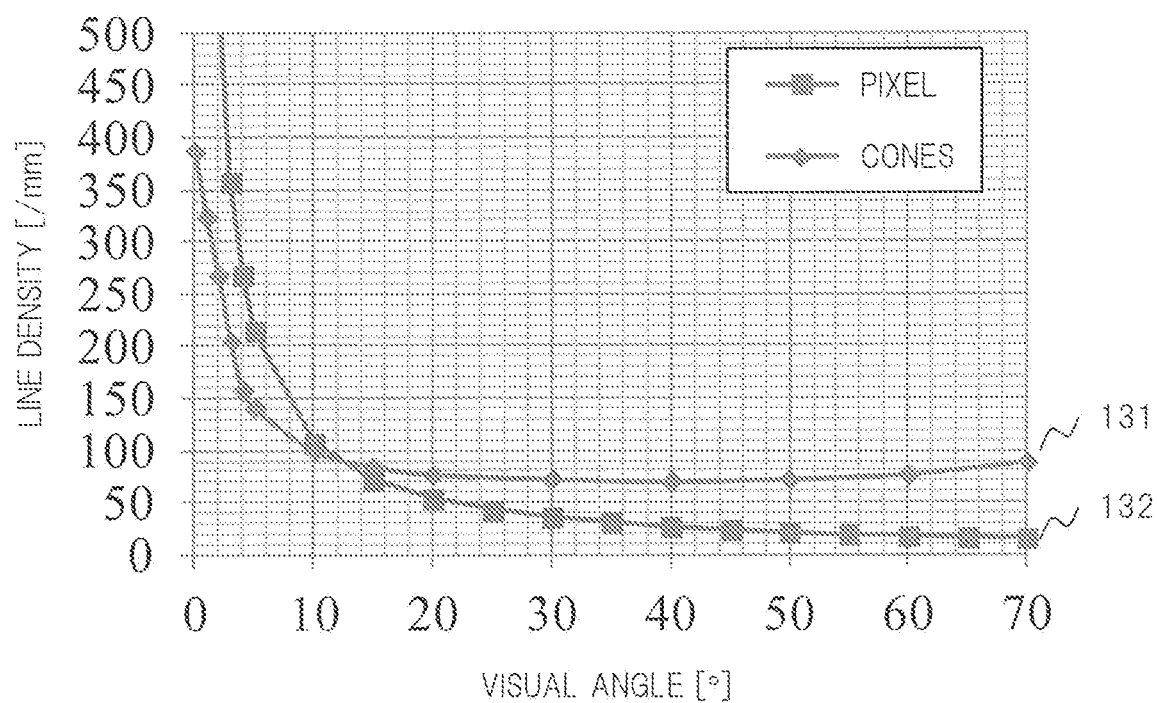
FIG. 13 is a diagram showing relation between a visual angle and a density related to cone distribution and a pixel configuration of the first mode in the first embodiment.

As shown in FIG. 13 described later, the configuration of the pixel density of the first mode or others is designed so as to be fitted with the eye characteristics to be similar to the distribution of the density of the retinal cones. In some regions close to the point P0 corresponding to the gaze-direction center, the eyes use the cones to recognize the high resolution, and therefore, the pixel density is increased. In the outer circle region, the eyes recognize the relatively low resolution, and therefore, the pixel density is suppressed to be relatively low. The visual angle, in other words, the maximum value of the radius H increases by an amount of the suppression.

[Second Mode—Pixel Configuration]

Figure 10:
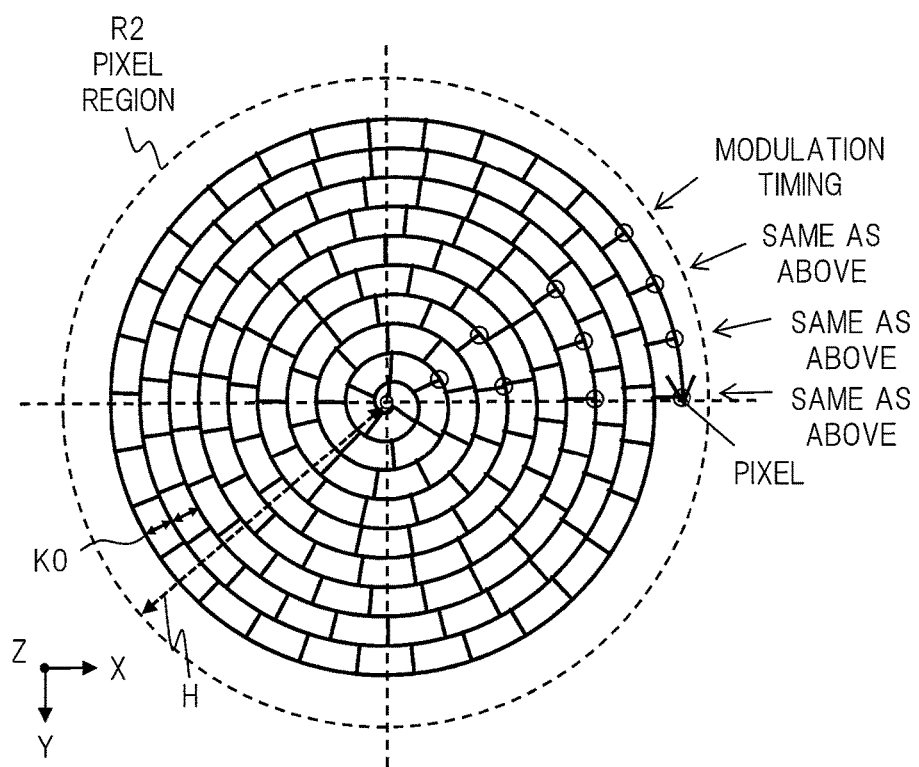
FIG. 10 is a diagram showing a pixel configuration and characteristics of a second mode in the first embodiment.

FIG. 10 shows the pixel configuration of the second mode on the X-Y plane. An upper drawing of FIG. 10 shows the pixel density on the X-Y plane and others caused when the image light from the image projector 103 is projected on the screen 2 on the basis of the scan driving in FIGS. 7 and 8. A lower drawing of FIG. 10 shows a summary table of the characteristics of the pixel configuration of the second mode. The upper drawing of FIG. 10 similarly shows a pixel region "R2" where the pixel is formed. A positional example of the pixel is shown with a small circle. An area (that is the visual angle) of the pixel region R2 of the second mode may be different from an area (that is the visual angle) of the pixel region R1 of the first mode, and these areas are determined in accordance with the design of the scan driving and the modulation driving.

In the pixel configuration of the second mode, the pixel density of the pixel region R2 is designed to be constant in the inner circle region that is close to the center point P0 as well as the outer circle region in the radial direction. That is, in the pixel region R2, constant resolution is provided. The second mode is designed so that the pixel density is constant on the screen as similar to the general screen design in the related art. The scan driving and the modulation driving of the image projector 103 are designed so that the pixel density is constant on the screen 2.

The scan driving of the second mode is similar to that of the first mode as shown in FIGS. 7 and 8. In the spiral scan trace, the scan speed is relatively slow in the inner circle and is relatively fast in the outer circle. The time (cycle Tc) for one circle is constant in both the inner circle and the outer circle.

In the modulation driving of the second mode, the modulation speed is relatively slow in the inner circle and is relatively fast in the outer circle. In the second mode, the modulation speed of the outermost circle in the radial direction is designed to have the maximum value. For example, the number of times of the modulation timing of the outermost circle is "M" times. The modulation speed of the inner circle is designed to be slower than the modulation speed of the outermost circle. The number of times of the modulation timing of the inner circle is "N" times less than "M" times. In the second mode, even if the inner circle has a performance capable of displaying the high resolution image, the slow modulation speed is purposely set to be fitted with the pixel density of the outer circle.

In the circumference of each of the spiral circles of the scan trace, the number of pixels is relatively less in the inner circle and is relatively more in the outer circle. In the circumference of each of the spiral circles, the arrangement interval of the pixels is constant in both the inner circle and the outer circle. In the pixel configuration of the second mode in FIG. 10, in the radial direction of the spiral, the interval KO between the adjacent circles is constant, in other words, an interval between adjacent pixels is constant.

When it is attempted to increase the visual angle, that is, the pixel arrangement region in the direction of the radius H while the pixel density is constant, a circumference of the circle is longer while being closer to the outer circumferential side of the scan trace. Therefore, it is necessary to further increase the modulation speed. The values of the scan speed and the modulation speed are the maximum value in the pixel region R2 and the outermost circle of the scan trace. Each of the scan speed and the modulation speed of the image projector 103 are limited to a predetermined maximum speed in accordance with hardware or others. Therefore, the values of the scan speed and the modulation speed in the pixel region R2 are designed so as to be the maximum value in the outermost circle in the radial direction.

[Modulation Driving]

FIG. 11 shows the modulation signal of the modulation driving in the first and second modes. In FIG. 11, a concept of the timing control of the intensity modulation of the image projector 103 is shown. FIG. 11(A) shows the modulation signal in the first mode, and FIG. 11(B) shows the modulation signal in the second mode. The modulation signal includes a plurality of light-emission synchronizing signals. The light-emission synchronizing signals define the modulation timing of the intensity modulation of the light source 301.

As shown in FIG. 9, the modulation driving in the first mode includes the constant modulation speed and modulation timing. In the modulation signal of FIG. 11(A), the plurality of light-emission synchronizing signals are supplied at a certain interval timing in both the first scan period T1 and the second scan period T2 of the scan driving.

As shown in FIG. 10, the modulation driving in the second mode includes variable modulation speed and modulation timing. In FIG. 11(B), in the first scan period T1, the plurality of light-emission synchronizing signals are supplied so that the interval between these signals gradually decreases. In the second scan period T2, the plurality of light-emission synchronizing signals are supplied so that the interval between these signals gradually increases.

[Eye's Characteristics (1)]

The characteristics of the human eyes and the pixel design of the first mode fitted with the characteristics will be described. As the eye's characteristics, it is known that the high resolution image is recognized in the gaze-direction center while the lower resolution image is recognized as the gaze direction shifts outward more from the center. The retina of the eye has photoreceptor cells. The light entering the eye is received by the photoreceptor cells on a deep side of the retina, and the image information is transmitted to a brain center through nerves of the eye. The photoreceptor cells convert optical stimulus into an electrical signal (nerve signal). The photoreceptor cell includes cones and rods. In the daily life, the cones are mainly used. The cones mainly function in a bright location, and the rods mainly function in a dark location. The cones can recognize difference among colors (wave lengths). The rods cannot recognize the difference among the colors but have high sensitivity.

Figure 12:
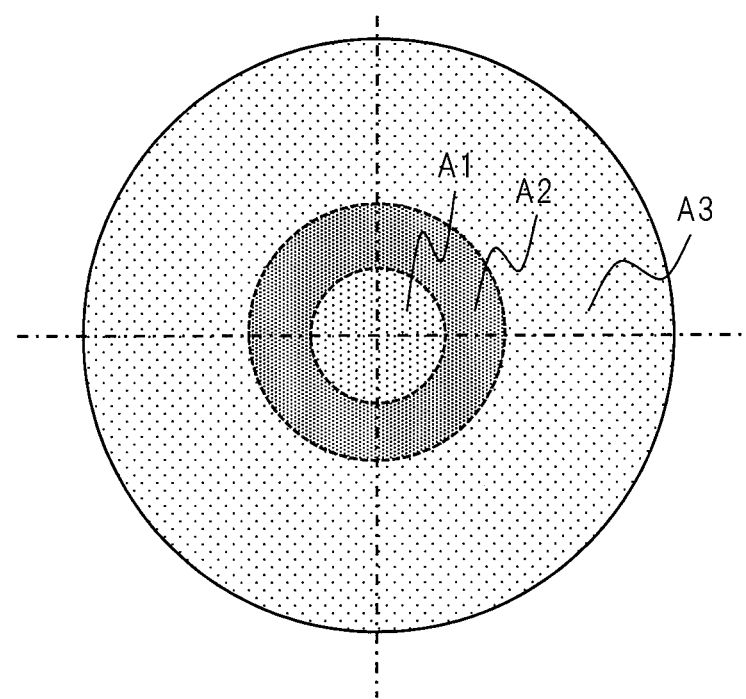
FIG. 12 is a diagram showing outline of distribution of retinal photoreceptor cells in the first embodiment.

FIG. 12 shows outline distribution of the photoreceptor cells of the retina. The center of the circle in FIG. 12 corresponds to fovea centralis that is the center of the retina. Regarding the distribution of the cones of the retina, a density of the cones is maximized in vicinity of the fovea centralis. When a visual angle is an angle from the fovea centralis, the density of the cones decreases depending on the visual angle. A region "A1" is a region corresponding to vicinity of the fovea centralis where the density of the cones is large, and the density of the cones is smaller while a point of the retina is closer to a region "A2" out of the region A1 and a region "A3" in periphery of the region A2 in this order. The rods mainly distribute around the cones. In the region A2, the density of the rods is large. As described above, the cones high densely distribute at the center of the eye, and therefore, color vision with relatively high resolution and others can be recognized at the gaze-direction center.

For two-point discrimination in the recognition of the sense of vision, it is necessary to arrange adjacent receptor cells receiving the stimuli so as to sandwich at least one receptor cell not receiving the stimuli. Therefore, it is only necessary to configure the pixels of the screen 2 so that the images can be presented with a half of the line density of the cones.

On the basis of the eye's characteristics as described above, the pixel configuration of the first mode (in FIG. 9) has been applied to the first embodiment as favorable pixel design. As the pixel configuration fitted with the eye's characteristics in the first mode, the pixel density of the region at the gaze-direction center is set to be relatively high to provide the high resolution while the pixel density of the region around the gaze direction is set to be relatively low to provide the low resolution. In the first mode, the center point P0 of the pixel region R1 corresponding to the image center is controlled so as to track the gaze direction at a moment. The favorable efficient images can be presented by the combination of the low resolution region at the wide visual angle and the high resolution region at the gaze-direction center to present the images matched with the gaze direction in the pixel configuration of the first mode. On the other hand, in the second mode, the pixel configuration with the constant resolution in the entire screen 2 is applied (FIG. 10). By situationally separately using the first mode and the second mode in accordance with a type of the presented image or others, more effective images can be presented.

[Eye's Characteristics (2)]

FIG. 13 show a graph obtained by plotting the pixel line density with respect to the visual angle [degrees (°)] so as to be fitted with the eye's characteristics of FIG. 12. A characteristic curve 131 shows the characteristics related to the density distribution of the cones of the retina as shown in FIG. 12 on the basis of the public knowledge related to the sense of vision. As shown in the drawing, in the characteristic curve 131, the cone density is high in the region with the small visual angle, and the cone density decreases at the large visual angle to be eventually almost constant.

On the other hand, a characteristic curve 132 shows characteristic design related to the pixel configuration of the first mode of the first embodiment as shown in FIG. 9, and is configured so as to provide a half of the cone line density on the basis of the characteristic curve 131. The modulation timing of the modulation driving is fixed as shown in FIG. 9. As described above, these two graphs are similar to each other in the characteristics, and the characteristic curve 132 is designed so as to have a shape similar to that of the characteristic curve 131.

In the pixel region R1 of the first mode, the characteristics (the characteristic curve 132) demonstrating the change of the pixel density is designed so as to be matched with the characteristics (the characteristic curve 131) demonstrating the general density change of the distribution of the photoreceptor cells (particularly the cones) of the retina of the eye. Specifically, the characteristic curve 131 for the cones can be approximately expressed in a quadratic function or others. On the other hand, the characteristic curve 132 for the pixels is similarly expressed in a quadratic function or others. These quadratic functions or others are set while parameters such as the speeds of the modulation driving and the scan driving change. In the manner, the shape of the characteristic curve (the approximate quadratic function or others) 132 for the pixels is set so as to be sufficiently similar to the shape of the characteristic curve 131 (the approximate quadratic function or others) for the cones. The sufficient similarity may be made by, for example, calculating similarity between the characteristic curve 131 and the characteristic curve 132 and setting the similarity to be equal to or larger than a predetermined value. The similarity may be calculated by using a value of difference in the density value at each visual angle between the characteristic curves.

In the example of FIG. 13, the calculation has been made under conditions in which a focal length of the eyeball is 17 mm and in which the number of pixels per the circle of the scan trace in the intensity modulation of the light source 301 of the image projector 103 is 2000 (that is, the number of times of the modulation timing is 2000 times on one circle).

At the time of the first mode, the image display apparatus controls the scan driving and the modulation driving of the image projector 103 on the basis of the characteristic curve 132, applies the pixel configuration as shown in FIG. 9, and projects the image light onto the screen 2. In the manner, at the time of the first mode, the sufficient favorable images fitted with the eye's characteristics as shown in the characteristic curve 131 can be presented, in other words, the image recognition with the high resolution can be always achieved at the gaze-direction center.

First Mode—Modification Example

The details related to the pixel configurations of the first mode and the second mode are not limited to the configurations of FIGS. 9 and 10. As the modification example of the first embodiment, the following configuration is also applicable to the pixel configuration of the first mode. As the modification example, a method for the intensity modulation of the light source 301 of the image projector 103 is unnecessarily limited to the control at the fixed modulation timing in the first mode. Various modulation driving are applicable as long as the pixel configuration of the first mode is configured so that the pixel density is relatively lower as the circle is closer from the center to the outside. For example, a method of controlling the modulation driving so as to provide a modulation speed in proportion to a half of the line density of the cones in FIG. 13 may be applied. Also, a method for the scan driving is also unnecessarily limited to the control of the scan speed, the amplitude, and others in the first embodiment.

FIG. 14 shows the pixel configuration of the first mode in the modification example of the first embodiment. This drawing shows a configuration obtained by developing the pixel configuration in detail so that the shape of the characteristic curve of the first mode is more similar to that of the characteristic curve 132 for the cones. FIG. 14(A) shows a configuration on the X-Y plane related to the control of the modulation timing of the modulation driving in the pixel configuration of the modification example. FIG. 14(B) shows a configuration on the X-Y plane related to the control of the amplitude of the scan driving in the pixel configuration of the modification example. By combination of (A) and (B), the pixel configuration of the modification example is provided. In this pixel configuration, the pixel density of the region at the gaze-direction center is slightly lower and the pixel density of the region on the outer circle is slightly higher than those of the pixel configuration of FIG. 9 of the first mode of the first embodiment. In the manner, the favorable display further fitted with the characteristics of the cones is achieved.

In FIG. 14(A), the modulation speed is closer to a speed (m1) that is slightly slower than a certain value (m0) while the circle is closer to the inner side near the center point P0, and is closer to a speed (m2) that is slightly faster than the certain value (m0) while the circle is closer to the outer side in the radial direction (m1<m0<m2). The certain value (m0) is the modulation speed of the first mode of the first embodiment.

In the modulation example, this interval may be relatively narrower while the circle is closer to the inner side, and may be relatively wider while the circle is closer to the outer side. Alternatively, in accordance with the combination with the modulation driving, this interval may be relatively wider while the circle is closer to the inner side and may be relatively narrower while the circle is closer to the outer side.

In FIG. 14(B), the scan speed is relatively slower while the circle is closer to the inner side and is relatively faster while the circle is closer to the outer side as similar to the first embodiment. In the spiral of the scan trace in this modification example, the interval between the adjacent circles in the radial direction H is wider while the circle is closer to the inner side near the center point P0 and is narrower while the circle is closer to the outer side. In this modification example, by the control of the amplitude of the scan driving, the interval between the circles of the scanning is changed so as to be fitted with the density distribution of the cones. As an example of the interval between the circles, an interval "Kc" at a position close to the center, an interval "Ka" at a position close to the outermost circle, and an interval "Kb" at a middle position between these positions will be described. These points have a relation of "Ka<Kb<Kc". By the control of the amplitude of the waveform of the scan signal as shown in FIG. 8, such change of the interval between the circles of the scan trace can be controlled. More specifically, at the time of the scan driving, a value of the voltage applied to the piezoelectric element 303 of the image projector 103 in FIG. 6 may be changed by the scan signal. As a different method of changing the interval, the change of the direction of the emission light from the optical fiber 302 may be increasingly/decreasingly adjusted in the direction of the radius H by physical design of the lens 305. As an example of the design of the lens 305, refraction may be larger while its portion is closer to an outer circumference. In such a pixel configuration as causing a wider interval between the circles of the scan trace while the circle is closer to the outside, when a beam diameter of the optical fiber 302 on the retina is smaller than the interval, aberration may be formed by the design of the lens 305 so as to cause a larger beam diameter while the circle is closer to the outside.

In recent years, note that a technique that is called Foveated Rendering has been developed, the technique rendering the images with the high resolution at the gaze-direction center and the images with the low resolution in vicinity of the gaze direction. This technique is utilized for reducing a calculation processing load of the images, and it is necessary to provide the high resolution over the entire visual angle of the images. The technique of the present invention is different from such a related art.

[Screen and Pixel Region (1)]

FIG. 15 shows a relation between the above-described pixel region and the screen 2 of the image display apparatus of the first embodiment. FIG. 15(A) shows a case of the first mode, and FIG. 15(B) shows a case of the second mode.

In FIG. 15(A), the screen 2 has, for example, a rectangular shape. In a region of this screen 2, the external environment image is transparently displayed as a background. Inside the screen 2, a display target region 151 shown with a broken line is set. The display target region 151 is set to have, for example, the same rectangular shape as that of the screen 2. However, the shape is not limited to this, and can be set. For example, in a case of the AR display, this display target region 151 is a region where the AR image information can be overlapped and displayed on the external environment image. In accordance with the image information of the display target, the image information is displayed at a predetermined position inside the display target region 151.

A circle region 152 is a region corresponding to the above-described pixel region R1. This region 152 is set so as to include the display target region 151 of the screen 2. In this region 152, the pixels are arranged so that the image can be displayed in the display target region 151. That is, in this region 152, the above-described scan driving and modulation driving are performed. Since the above-described pixel region R1 has the substantially circle shape, this region 152 has a shape of and a size of a circumscribed circle of the rectangle of the screen 2.

Centers of the screen 2 and the display target region 151 are shown as a point "C0". A case in FIG. 15 shows that the gaze direction of the user is at the point C0. That is, the center point of the circular region 152 is controlled so as to be matched with the point C0. As described above, in the image display of the first mode, the pixel density is higher while the image display position is closer to the center of the region 152, and the pixel density is lower while the image display position is closer to the outside. For example, in the region a1 at the gaze-direction center, the resolution is sufficiently high. Note that a region "a3" of the region 152, the region a3 being on an outside of the screen 2, is a black region where it is unnecessary to display the images.

FIG. 15(B) similarly shows the screen 2 and the region 152 in the second mode. The region 152 corresponds to the pixel region R2. In the display target region 151, the pixel density and the resolution are constant in both the vicinities of the center and the outer circumference.

The configuration of the region 152 on the basis of the screen 2 is not limited to the above-described configuration. As described in modification examples described later, a shape of and a size of the region 152 can be variously set in accordance with the controls of the scan driving and the modulation driving.

[Screen and Pixel Region (2)]

Figure 16:
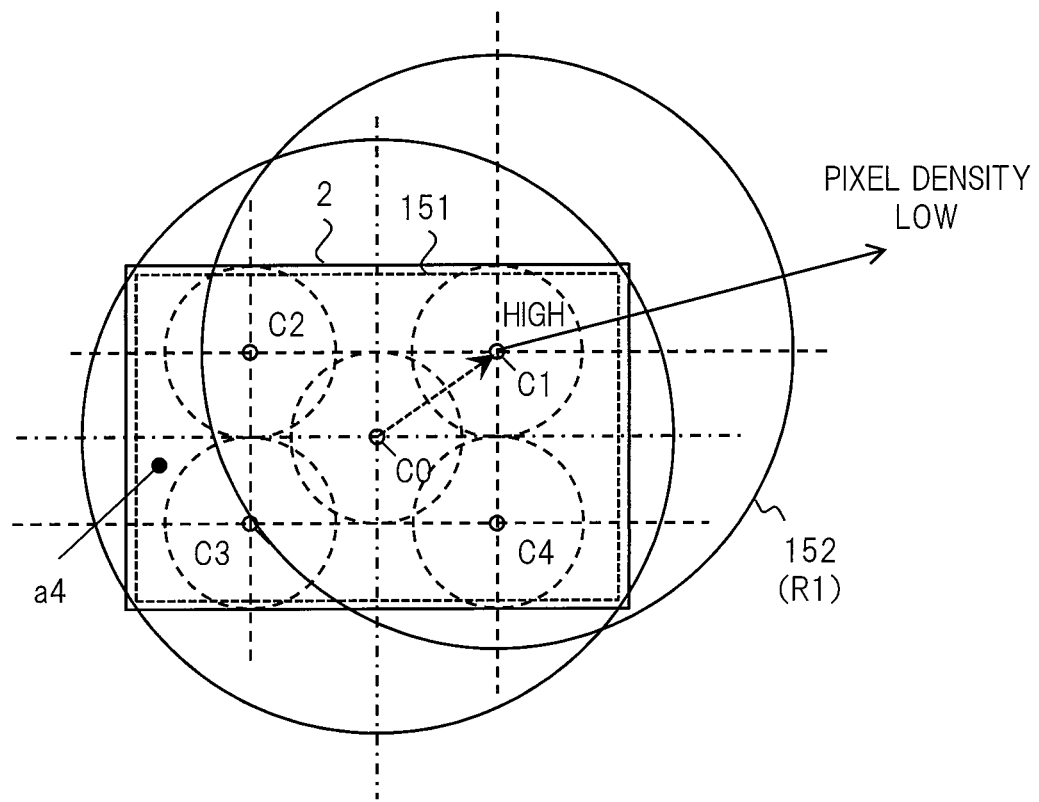
FIG. 16 is a diagram showing a case in which a gaze direction moves in the first mode in the relation between the screen and the pixel region in the first embodiment.

FIG. 16 shows an example of a state in which the region 152 is moved by a tracking operation in accordance with the change of the gaze direction in comparison with the region 152 of the first mode of FIG. 15(A). The gaze direction of the user moves from the center point C0 of the screen 2 to, for example, a point "C1" in vicinity of a right upper side thereof. The center point of the region 152 is controlled so as to be matched with the gaze direction in accordance with the gaze-direction detection. In FIG. 16, the center point of the region 152 is arranged at the point C1. In accordance with this arrangement, the region a1 with the high resolution moves to a portion in vicinity of the point C1. Therefore, the image with the high resolution is presented to the user while the user is watching the image in vicinity of the point C1, so that the user recognizes the high resolution image. Also when the gaze direction of the user moves to points "C2" to "C4" or others, the center point of the region 152 similarly moves to a position matched with the gaze direction.

Note that a region "a4" inside the screen 2 becomes a non-display region where the pixels is not formed, because of the movement of the region 152. However, this region hardly affects the recognition in the sense of vision because of being the region far from the gaze direction. As a modification example, a scanned region or others may be enlarged in order to display the image with the low resolution even in the region a4.

Screen and Pixel Region—Modification Example (1)

In the first embodiment, the characteristic curve of the pixel configuration of the first mode is configured so that successive changes in the pixel density and the scan speed are made in the radial direction of the scan trace. The configuration of the characteristic curve is not limited to this, and the characteristic curve of the pixel configuration of the first mode as a modification example may be configured so that stepwise changes in the pixel density and the scan speed are made in the radial direction of the scan trace.

Figure 17:
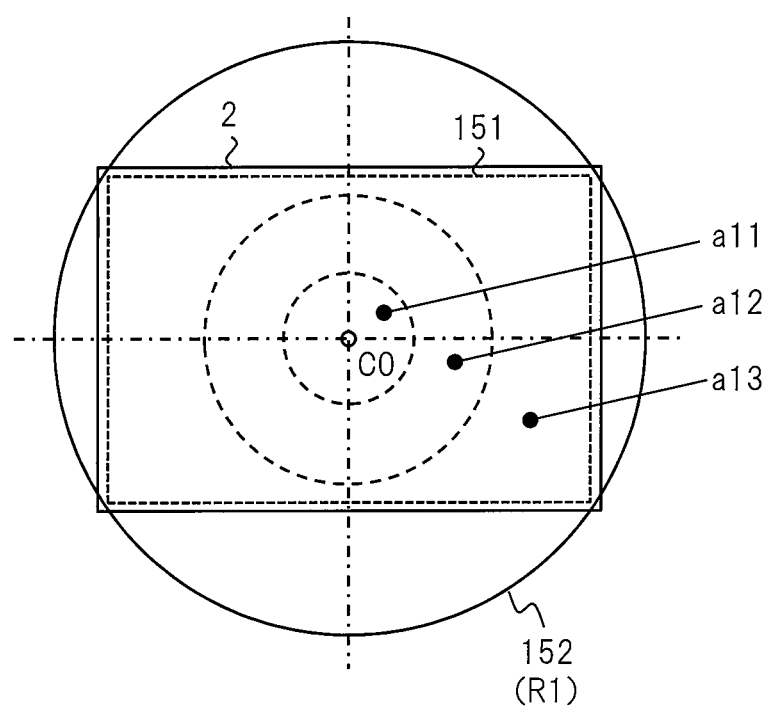
FIG. 17 is a diagram showing the pixel region of the first mode in a modification example of the first embodiment.

As a modification example of the first embodiment, FIG. 17 shows an example of formation of three types of regions having different resolutions from one another in the region 152 of the first mode in comparison with the display target region 151 of the screen 2. A region "a11" in vicinity of the center point C0 is a region with a first pixel density, a region "a12" on an outside of the region a11 is a region with a second pixel density, and a region "a13" on an outside of the region a12 is a region with a third pixel density. For example, as described above, the pixel density is relatively high in the center region a11, and is relatively low in the region a13 on an outer region. As described in this modification example, an aspect of stepwise formation of regions with two or more step pixel densities in the screen 2 may be applied.

To the first embodiment, the configuration of the pixel density matched with the distribution of the cone density has been applied. The configuration is not limited to this. As a modification example, a configuration of a pixel density matched with a distribution of a retinal rod density may be applied thereto. By the pixel configuration fitted with the rods, the images or others can be provided with a small power. As the pixel configuration fitted with the rods, a configuration as shown in FIG. 17 may be applied. In this case, the pixel density of the middle region a12 of the region 152 is set to be the highest so as to correspond to the rod region A2 in FIG. 12.

Screen and Pixel Region—Modification Example (2)

Figure 18:
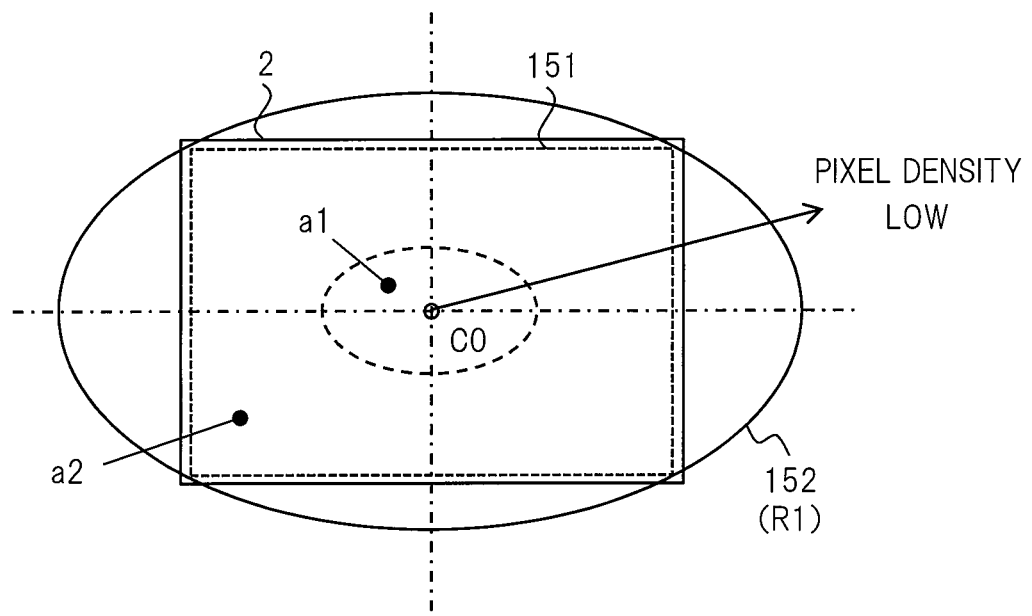
FIG. 18 is a diagram showing the pixel region of the first mode in a modification example of the first embodiment.

As a modification example of the first embodiment, FIG. 18 shows a case in which the shape of the region 152 is ellipsoidal so as to be matched with a horizontal to vertical ratio of the screen 2 in a relation between the screen 2 and the region 152. In FIG. 18, in the first mode, a horizontally-long ellipsoidal region 152 is applied so as to be matched with horizontally-long screen 2 and display target region 151, each of which has a shorter Y-directional width than an X-directional width. The region 152 has a circumscribed ellipsoidal shape including the display target region 152. By the amplitude control of the scan signal of the scan driving, the scan trace can be formed into the ellipsoidal shape. The amplitude maximum value of the waveform of the scan signal in the Y direction is smaller by a predetermined ratio than the amplitude maximum value of the waveform of the scan signal in the X direction.

Screen and Pixel Region—Modification Example (3)

As a modification example of the first embodiment, FIG. 19 shows a case in which the pixel region R1 with a smaller size than that of the screen 2 is formed in the configuration of the region 152 in comparison with the screen 2 and the display target region 151. FIG. 19(A) shows the region 152 obtained when the gaze direction is at the center point C0 of the screen 2 in the first mode. This region 152 has an inscribed circle on the rectangular screen 2. In the first mode, this region 152 is set to the display target region 151. A region "a5" on an outside of the region 152 inside the screen 2 is set to the non-display region where the pixel is not formed. The pixel density is lower while a portion of this region 152 is closer to outside from an inner circumference, and the high resolution is presented in vicinity of the center.

FIG. 19(B) shows a case of movement of the gaze direction from the state of FIG. 19(A) to, for example, the point C1 in vicinity of the right upper side inside the screen 2. The center point of the region 152 is controlled so as to track the gaze direction and reach the point C1. Note that the shape of the region 152 is not limited to the circle, and may be ellipsoidal or rectangular as similar to the above-described shapes.

Effect and Others

As described above, according to the image display apparatus of the first embodiment, the images with the high resolution can be achieved with a low cost, a small apparatus size and low power consumption at the wide visual angle and the center of the visual field. In the configuration of the first embodiment, the display devices such as two LCD as described in the related-art example are unnecessary, and therefore, the image display is achieved with a low cost, a small apparatus size and low power consumption.

Modification Example

An implementation aspect of only the first mode is also applicable as a modification example of the first embodiment. In this aspect, the image display with the pixel configuration of the first mode is always performed.

Second Embodiment

With reference to FIGS. 20 to 23, an image display apparatus of a second embodiment of the present invention will be described. A basic configuration of the second embodiment and others is the same as that of the first embodiment, and differently-configured parts of the second embodiment and others from those of the first embodiment will be described below. In the second embodiment, the shape of the pixel region is not circular but rectangular. The configuration of the second embodiment is achieved by changing control contents of the image projector 103 from those of the first embodiment.

[Screen and Pixel Region]

Figure 20:
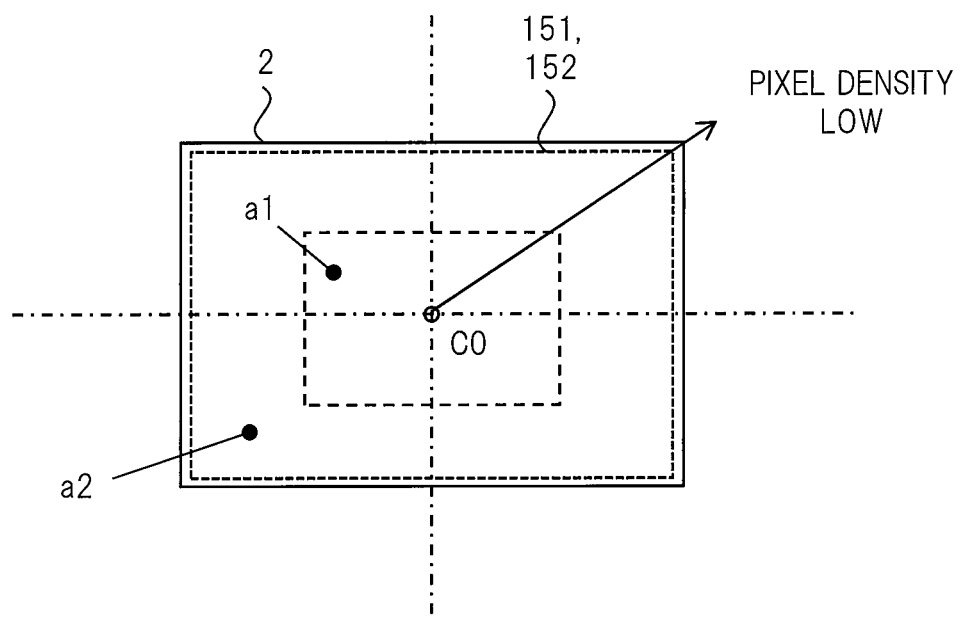
FIG. 20 is a diagram showing the pixel region of the first mode in an image display apparatus of a second embodiment of the present invention.

FIG. 20 shows a relation between the screen 2 and the pixel region in the second embodiment. A section of the second embodiment will describe a case in which a shape of the region 152 where the pixel is formed is rectangular so as to be matched with the rectangular screen 2 and display target region 151. In this example, the display target region 151 and the region 152 are the same as each other. In the rectangular region 152 of the first mode, a relatively high resolution is presented to the regional in vicinity of the center point C0. In the region 152, for the scan driving and the modulation driving of the image projector 103, not the above-described spiral method but a method as shown in FIGS. 21 and 22 described later is used.

[Scan Driving]

Figure 21:
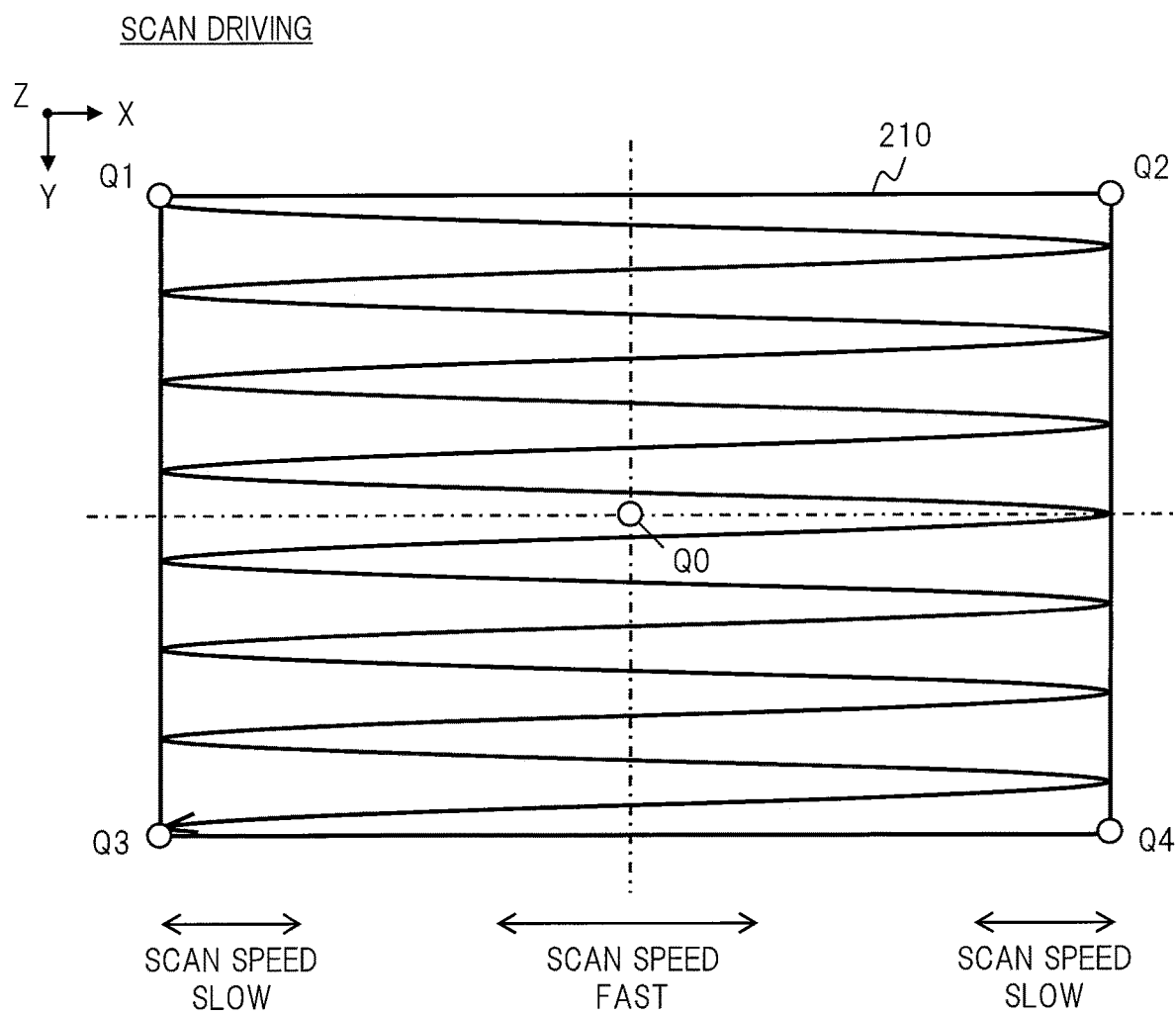
FIG. 21 is a diagram showing a scan trace of scan driving in the second embodiment.
Figure 22:
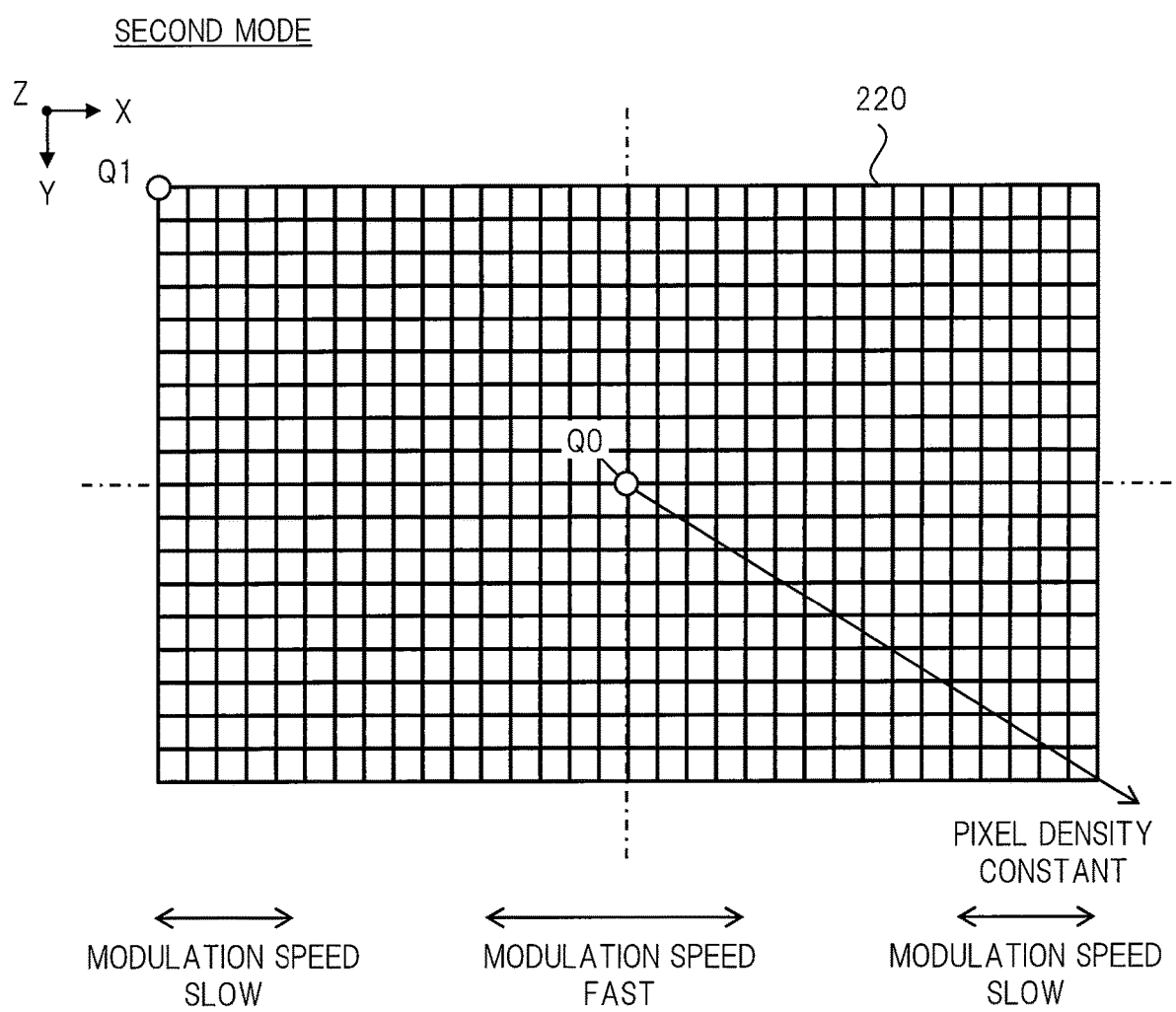
FIG. 22 is a diagram showing a pixel configuration of a second mode in the second embodiment.

FIG. 21 shows a concept of the scan driving of the second embodiment on the X-Y plane. In accordance with the pixel region (region 152), a shape of a scan region 210 is rectangular. A center point of the scan region 210 is indicated by a point "Q0". A wavy arrow line indicates a scan trace and a scan direction. One example of this scan trace is a trace obtained by performing the scanning in a right-and-left direction from an upper end of a visual angle (pixel region) to reach a lower end thereof. First, the scanning is started from, for example, an upper left point "Q1" of the scan region 210. A scan speed in a Y direction is set to constant. The scanning in an X direction draws a waveform that oscillates with predetermined speed and amplitude in accordance with a width of the scan region 210. In a first scan period that is a first period, the scanning is performed to, for example, a lower left point "Q3". In a second scan period that is a next period, a scan direction that is, for example, the Y direction is turned to a reverse direction, and then, the scanning is similarly performed so as to return from the point Q3 to the point Q1. In the manner, the scanning for one frame of the image has been performed. Then, the similar scanning is performed for each frame of the image. In a different method, a method of returning the scanning to the upper end point Q1 after the scanning reaches the lower end point Q3, and then, similarly performing the scanning toward the lower end again may be applied. The scanning method is not limited to the above-described scanning methods, and so-called television scanning method or others such as a method of performing the scanning in a line-sequential manner may be applied.

The above-described scan driving is achieved by the scan driving of the image projector 103. That is, this is achieved by combination of the scan signals in the X and Y directions. As a configuration example of the image projector 103 for this purpose, a configuration using a MEMS mirror capable of performing two-dimensional optical scanning may be applied. The MEMS mirror is one of elements that are generally used in an image display apparatus such as a projector, and therefore, is easily applied.

[Second Mode—Pixel Configuration]

FIG. 22 shows a pixel configuration of a second mode in the second embodiment. In a rectangular pixel region 220 corresponding to the scan region 210, a pixel density is constant. In the second mode, the scan driving and the modulation driving of the image projector 103 are performed so that the pixel density is constant. In the scan driving, as shown in FIG. 21, the scanning in the right-and-left direction that is the X direction draws a sine wave shape. In the X direction, the scan speed of the scan trace of the scan region 210 is relatively slow on right and left ends, and relatively fast in vicinity of a center point "Q0". In accordance with this, the modulation driving is controlled so that a speed of and a timing of the intensity modulation of the light source 301 of the image projector 103 are relatively slow on right and left ends and relatively fast in vicinity of the center point "Q0".

Figure 23:
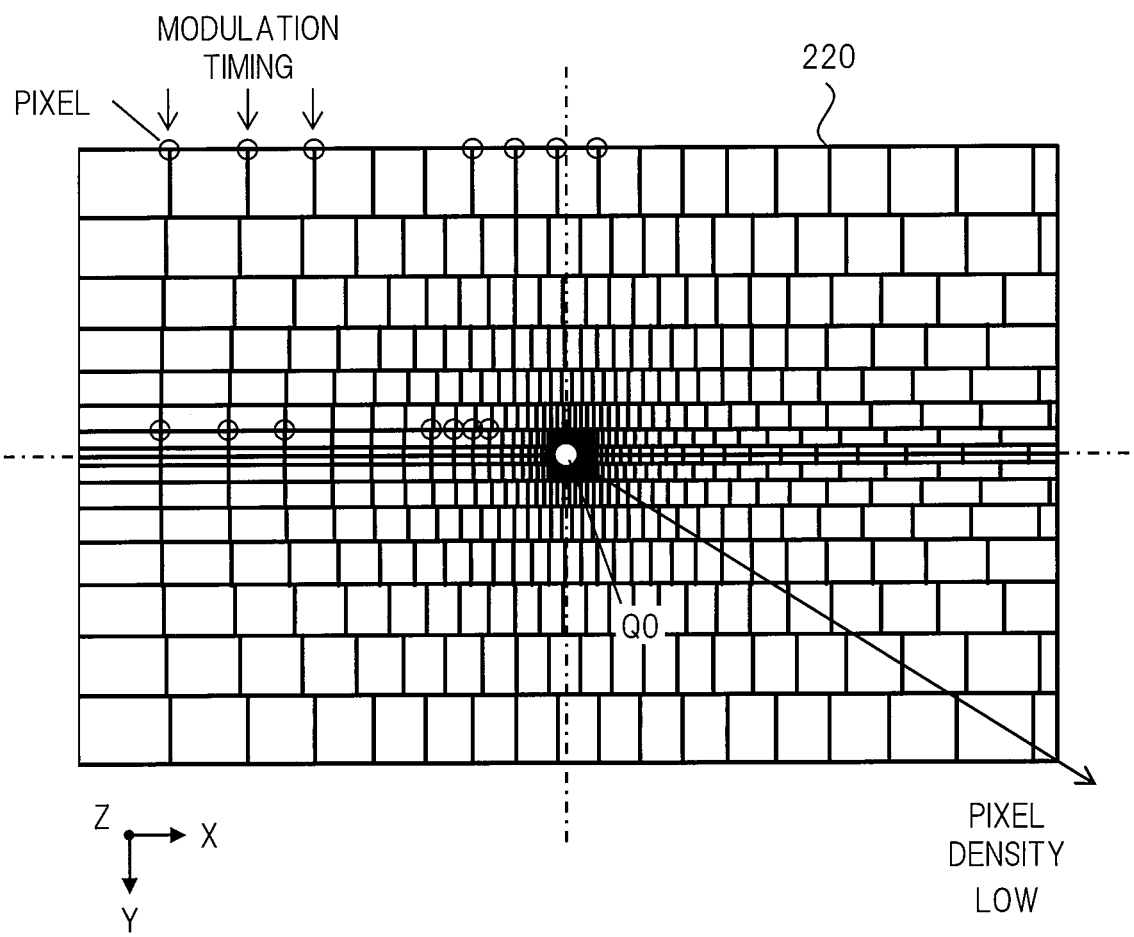
FIG. 23 is a diagram showing a pixel configuration of a first mode in the second embodiment.

FIG. 23 shows a pixel configuration of the first mode in the second embodiment. FIG. 23 shows a case in which the gaze direction is at the center point Q0 of the screen 2. In the rectangular pixel region 220, the pixel density is designed so as to be higher while a portion of the region is closer to the center of the visual angle and lower while it is closer to the circumference. In the scan driving, in the Y direction, an interval between the adjacent traces is narrower while the traces are closer to the center of the pixel region 220.

The scan driving and the modulation driving of the image projector 103 are controlled so as to achieve the pixel region 220 of the first mode. As this control method, various control methods are applicable as similar to the first embodiment. This pixel configuration may be achieved by the control for the modulation speed of the light source 301 of the image projector 103. Alternatively, this pixel configuration may be achieved by control for a scan speed of a MEMS mirror by which the image projector 103 is formed.

As the configuration of the image projector 103, note that a panel (display device) such as a liquid crystal display, an organic EL display, an LCOS (Liquid Crystal On Silicon), and a DMD (Digital Mirror Device) in each of which the pixels are two-dimensionally arranged may be used in place of the MEMS mirror. In this case, a hardware structure itself in physical pixel design of the panel (display device) is designed to have a configuration with such an uneven pixel density in a plane as causing a higher pixel density while a portion of the plane is closer to the center and a lower pixel density while it is closer to the circumference thereof. This case takes an aspect performing only the first mode.

Further, another aspect may be configured so that the image light is transmitted by using the image projector 103 causing even or uneven pixel density in a plane and an optical component such as a lens so as to cause a higher pixel density while a portion of the plane is closer to the center and a lower pixel density while it is closer to the circumference thereof.

As descried above, according to the second embodiment, the same effect as that of the first embodiment can be achieved in the rectangular pixel region, in other words, the image with the high resolution at the wide visual angle and the center of the field of view can be presented in the region. The second embodiment is easier to be applied in the mounting than the first embodiment since the configuration of the image projector 103 can be achieved by a more general configuration.

Third Embodiment

Figure 24:
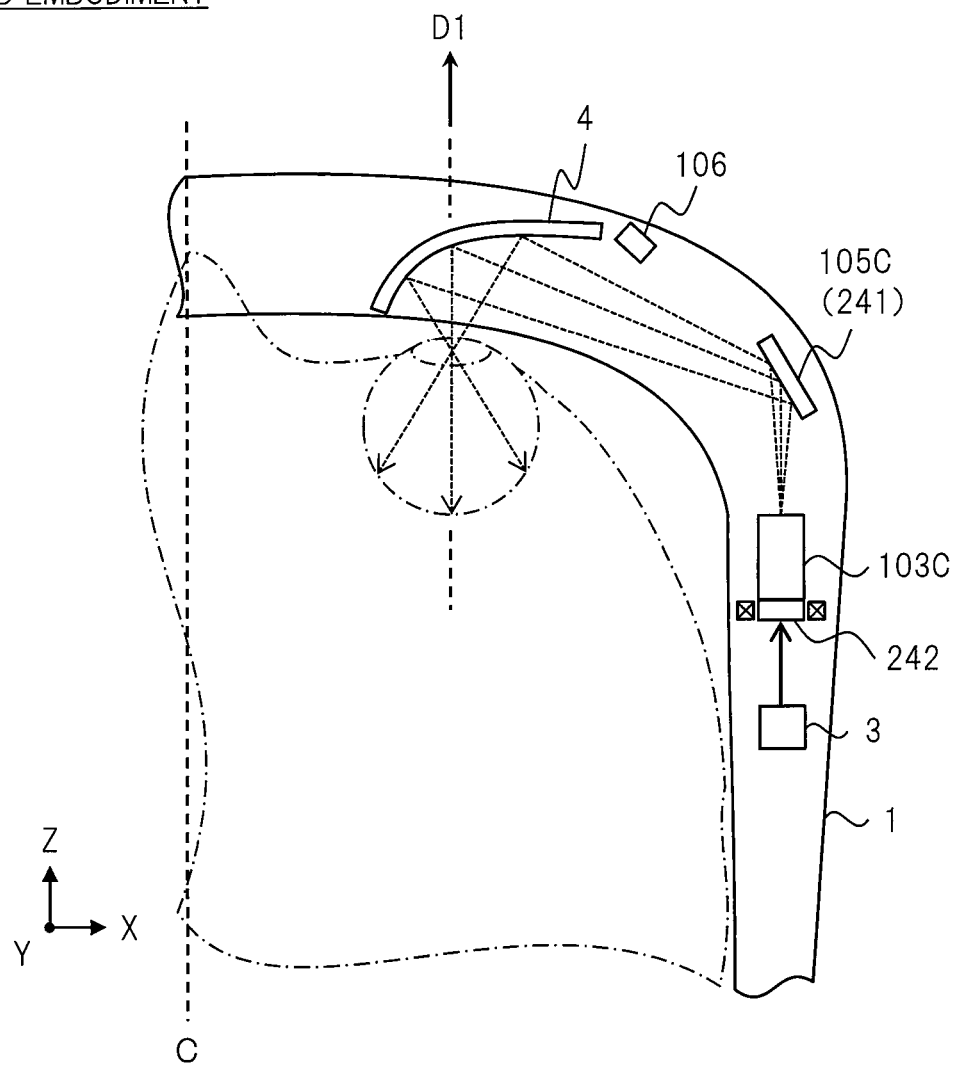
FIG. 24 is a diagram showing a configuration of components on a right half portion of a housing in an image display apparatus of a third embodiment of the present invention.
Figure 25:
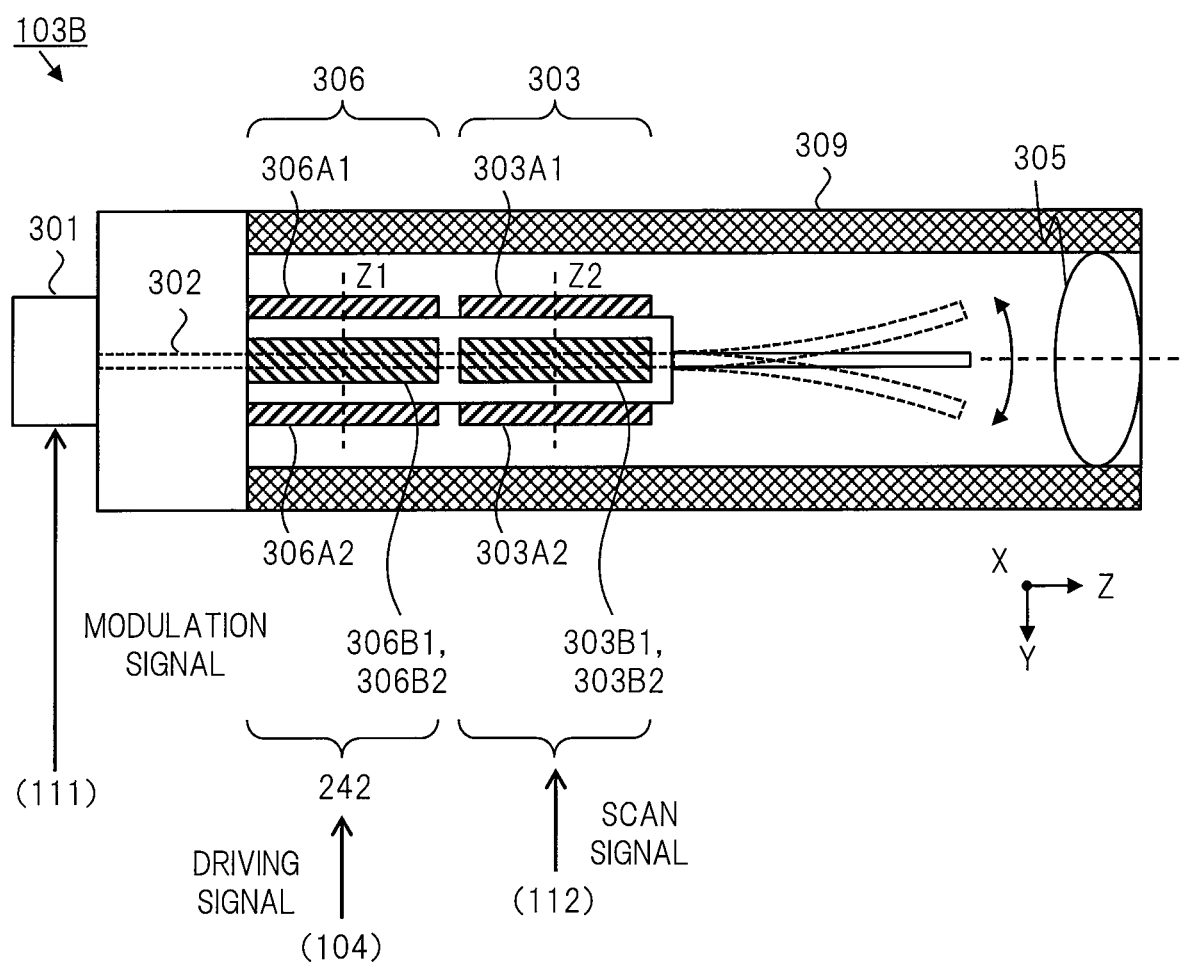
FIG. 25 is a diagram showing a component configuration of an image projector in the third embodiment.

With reference to FIGS. 24 and 25, an image display apparatus of a third embodiment of the present invention will be described. As a modification example of the first embodiment, a section of the third embodiment will describe another structure example related to elements such as the image projector 103 and the projection-direction driver 105.

As similar to FIG. 3, FIG. 24 shows a right-half configuration of the image display apparatus. The image display apparatus of the third embodiment has an image projector 103C and a projection-direction driver 105C. In this projection-direction driver 105C, a fixed mirror 241 is arranged in place of the mirror and the actuator in the projection-direction driver 105 of the first embodiment. A reflection direction of the fixed mirror 241 is fixed.

This image projector 103C has a projection-direction driver 242 to be unified in addition to the configuration of the image projector 103 of the first embodiment. The projection-direction driver 242 changes the light emission direction of the laser light from the light source 301.

FIG. 25 shows a structure of the image projector 103C of the third embodiment. To the image projector 103B, a piezoelectric element 306 is added as a component configuring the projection-direction driver 242. This image projector 103B has the following different configuration points from the image projector 103 in FIG. 6. Inside a housing 309 of the image projector 103B, a pair of piezoelectric elements are arranged at two stages with respect to the optical fiber 302 extending in a Z direction. At a first position closer to the light source 301 in the Z direction, the piezoelectric elements 306 are arranged. At a second position closer to an end of the later stage of the first position Z1 in the Z direction, the above-described piezoelectric elements 303 are arranged. The piezoelectric elements 303 at the second stage are configured of two pairs of piezoelectric elements 303 {303A1, 303A2, 303B1 and 303B2}. The piezoelectric elements 303 have the same functions as those of the first embodiment, and are driven by the scan signal from the scan driving circuit 112. The piezoelectric elements 306 at the first stage are configured of two pairs of piezoelectric elements 306 {306A1, 306A2, 306B1 and 306B2}. These piezoelectric elements 306 are configured of the pair of piezoelectric elements 306A1 and 306A2 in the Y direction and the pair of piezoelectric elements 306B1 and 306B2 in the X direction as similar to the piezoelectric elements 303, and are similarly arranged around the optical fiber 302.

The piezoelectric elements 306 at the first stage are driven by the driving signal from the projection-direction driving signal generator 104 on the basis of the gaze-direction information detected by the gaze-direction detector 106. That is, for example, a direction of the end of the optical fiber 302 is controlled so as to achieve a tracking operation matching the image center with the gaze-direction center.

The piezoelectric elements 303 achieve the spiral scanning for each frame of the image. Therefore, the piezoelectric elements 303 perform high-speed and cyclic operations. In comparison with this, the piezoelectric elements 306 at the first stage perform low-speed and non-cyclic operations for the gaze-direction tracking operation. Therefore, each of the piezoelectric elements 303 and the piezoelectric elements 306 may be made of a material and a structure fitted with the necessary characteristics, and it is unnecessary to use the same structure for both elements.

In addition to the above-described configuration, as the projection-direction driver 242, an element such as a MEMS mirror, a mirror driven by a piezoelectric element, a galvanometer mirror, a voice coil motor, and an ultrasonic motor, may be applied, the element having a function capable of driving and controlling a slope of the entire image projector 103.

As described above, according to the image display apparatus of the third embodiment, the similar effects to those of the first embodiment, that are the low cost, the small apparatus size, the low power consumption and others, can be achieved. In the third embodiment, the high resolution at the wide visual angle and the center of the field of view can be achieved with the small number of components and the control for bringing out the characteristics of the image projector 103.

Fourth Embodiment

Figure 27:
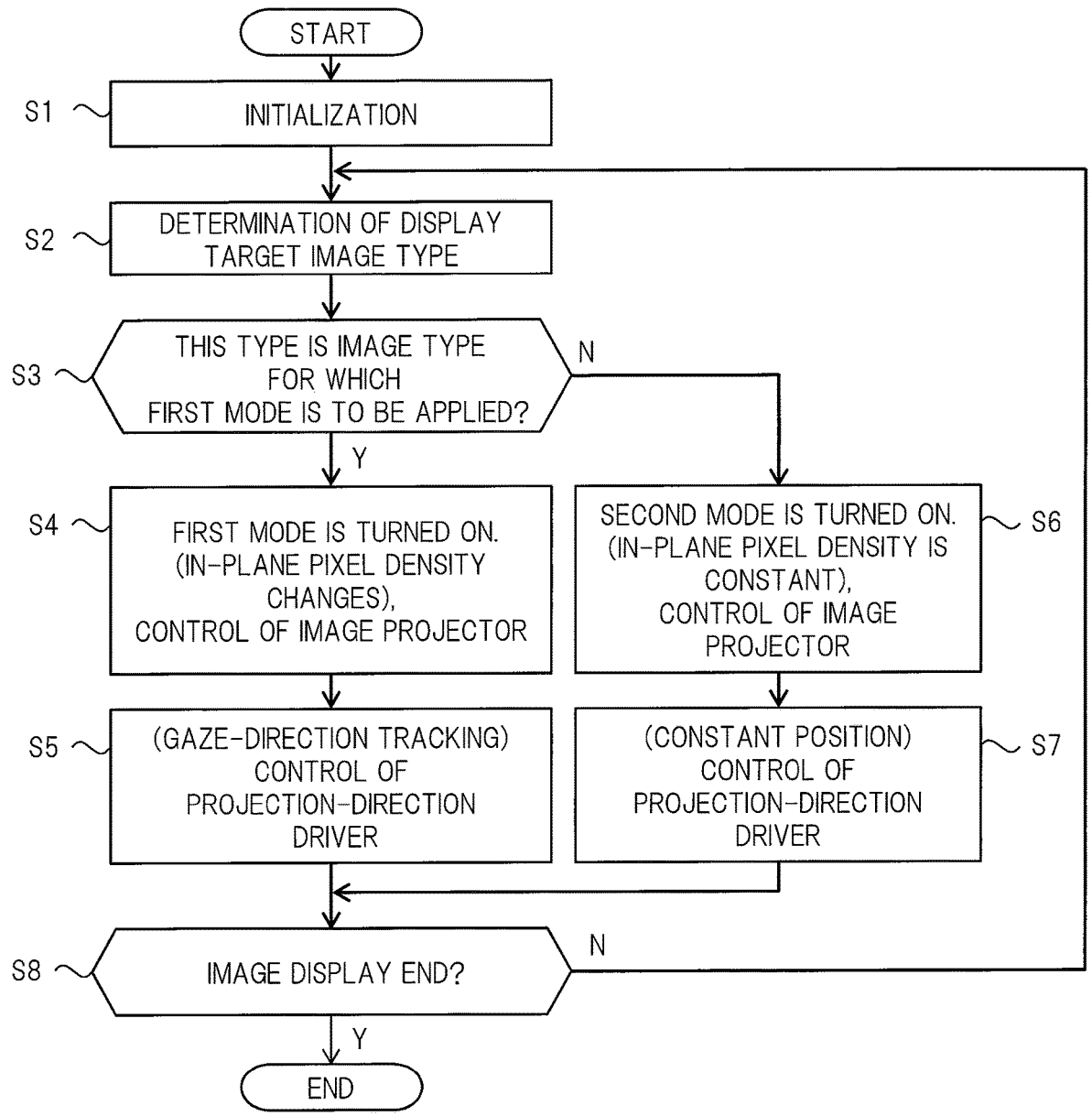
FIG. 27 is a diagram showing a flow of mode switching control in the fourth embodiment.

With reference to FIGS. 26 and 27, an image display apparatus of a fourth embodiment of the present invention will be described. The image display apparatus of the fourth embodiment has a unique control function switching a mode between a first mode and a second mode. FIG. 26(A) shows an example of a view state of the screen 2 in a state in which the mode is switched to the first mode. FIG. 26(B) shows an example of a view state of the screen 2 in a state in which the mode is switched to the second mode. In the image display apparatus of the fourth embodiment, the mode is automatically switched between the first mode and the second mode in accordance with a display target image type or others.

The first mode state allows the image center to track the gaze direction as described above, so that the image with the high resolution can be displayed at the gaze-direction center. However, for example, when the first mode is always applied to always allow the image to track the gaze direction for the display, it is necessary to always operate the gaze-direction detector 106 or others, and therefore, the power consumption of the image display apparatus is relatively large. Therefore, in the fourth embodiment, when it is unnecessary to allow the image to track the gaze direction, the mode is set to the second mode without the usage of the first mode so as to stop the tracking operation. In the manner, the power consumption can be suppressed.

In FIG. 26(A), in the first mode, a screen 261 is a substantially rectangular transparent-type screen 2, and corresponds to the field of view. In this example, on the screen 261, actual roads and buildings and others in the external environment are transparently displayed. A display target region 262 indicates a target range where the image information is overlapped and displayed so as to handle the AR or others and where the above-described pixels are formed. In the present example, the display target region 262 has a substantially rectangular shape almost as large as the screen 261. A point Q0 indicates center points of the screen 261 and the display target region 262. In the present example, in vicinity of the center inside this display target region 262, image information 263 is displayed. In the present example, the image information 263 is an arrow image for navigating or guiding the user to a travelling direction or others on the road, and is displayed to be overlapped on the road. For example, an application program handling the AR or others appropriately generates such image information 263, and displays the information at a right position inside the display target region 262.

When the display target image type is such image information 263, that is, when this is information to be displayed to be overlapped on the transparent display of the screen 261, the first mode is applied to the image display apparatus of the fourth embodiment. That is, the image display apparatus sets the display target region 262 so as to have the pixel configuration of the first mode, and performs the tracking operation so that the high-resolution region at the image center is matched with the gaze direction. When the image information 263 is displayed in the first mode, if the gaze direction of the user is in, for example, vicinity of the point Q0, the high resolution display is presented in vicinity of the gaze direction, and therefore, the user can recognize the image information 263 in the high resolution. If the gaze direction of the user changes from the portion in vicinity of the point Q0 to, for example, a point "QX", a portion in vicinity of the point QX is changed into the high-resolution region that is the center of the pixel configuration by the gaze-direction tracking. When the displayed image information exists in vicinity of the point QX at this time, this image information is displayed with the high resolution.

In addition to the image information 263 generated by an application program or others, various information is applicable, such as personal information of a person whom the user has seen, advertisement information of a building, and commercial-product information of a commercial product laid out on a rack of a shop. Such image information 263 is information that is overlapped and displayed on a position of the actual road, person, building, commercial product or others to provide significance and effects. The image display apparatus can be previously set so that the first mode is applied to such image information 263.

On the other hand, in FIG. 26(B), in the second mode, the screen 261 has a display target region 264. The display target region 264 is a partial region of the screen 261, the partial region having a constant pixel density. In the present example, the display target region 264 is arranged at a fixed position in vicinity of an upper left portion of the screen 261. Inside the display target region 264, image information 265 is displayed. An OS, an application program or others generates such image information 265. In the present example, the image information 265 is predetermined information such as time, a remaining battery level of the image display apparatus, and weather forecast. The image information 265 is information as an image type that is unnecessary to be overlapped and displayed on a position of an actual specific transparent image. This image information 265 is information that is unnecessary to have the high resolution at the wide visual angle and through the gaze-direction tracking.

When the display target image type is such image information 265, the second mode is applied to the image display apparatus of the fourth embodiment. That is, the image display apparatus displays the image information 265 with a certain resolution inside a predetermined display target region 264 so as not to perform the gaze-direction tracking operation. The display target region 264 is a pixel region at a narrow visual angle. Regardless of the gaze direction, the image information 265 with a certain resolution is displayed even when the gaze direction is at, for example, any of the point Q0, the point QX, and the point QX2. In accordance with an application program or others, a position of and a size of the display target region 264 may be a different position and a different size inside the screen 261, and the image with a certain resolution is similarly displayed.

FIG. 27 shows a flow of the mode switching control of the image display apparatus of the fourth embodiment. FIG. 27 includes steps S1 to S8. The steps will be sequentially described below.

In the step S1, when the image presentation starts on the screen 2, the image display apparatus initializes each component (such as the image projector 103 and the projection-direction driver 105 in FIG. 2) related to the image display inside the apparatus. The image display apparatus inputs the image data of or the image signal of the display target. In the step S2, the image display apparatus determines the display target image type. The image display apparatus may determine the image type with reference to, for example, metadata, attribute information, or others attached to the image data of or the image signal of the display target. The image display apparatus may determine the image type on the basis of, for example, a device of or a program of a generation source or a transmission source of the image data of or the image signal of the display target.

In the step S3, in accordance with the image type determined in the step S2, the image display apparatus determines whether to apply the first mode. For example, in the case of the image information to be overlapped and displayed on the basis of an application program of the AR as shown in FIG. 26(A), it is determined that the first mode is to be applied. In the case of the image information as shown in FIG. 26(B), it is determined that the first mode is unnecessary to be applied, and the second mode can be applied. In the step S3, if the first mode is to be applied (Y), the step proceeds to the step S4. Otherwise, that is, if the second mode is to be applied (N), the step proceeds to the step S6.

In the step S4, the image display apparatus turns on the first mode and turns off the second mode. That is, the image display apparatus controls the scan driving and the modulation driving of the image projector 103 so as to provide the above-described pixel configuration with the pixel density changing in the plane. In the step S5, the image display apparatus controls the projection-direction driver 105 so that the high-resolution region at the center of the pixel configuration in the display target region is allowed to track the gaze direction detected by the gaze-direction detector 106.

In the step S6, the image display apparatus turns off the first mode and turns on the second mode. That is, the image display apparatus controls the scan driving and the modulation driving of the image projector 103 so as to provide the above-described pixel configuration with THE pixel density being constant in the plane. In the step S7, the image display apparatus controls the projection-direction driver 105 so that the display target region is fixed at a predetermined position and in a predetermined range in the screen 2, regardless of the gaze direction. Further, in the step S6, note that the power consumption may be reduced by stopping the operation of the gaze-direction detector 106. When the turning on/off of the operation of the gaze-direction detector 106 are controlled, the image display apparatus performs such control as starting the operation of the gaze-direction detector 106 in the step S5.

After the step S5 or S7, the step proceeds to the step S8. In the step S8, the image display apparatus determines whether the image display ends or not. If the image display is continued, the step returns to the step S2 to repeat the similar control. For example, if the display target images are reproduced to the end, or if the user inputs an end instruction or others, the image display ends. If a new image signal is input or others, the image display is continued.

As described above, according to the fourth embodiment, the first mode or the second mode can be selected in accordance with the image type to provide the favorable display, and the low power consumption can be achieved.

Fifth Embodiment

Figure 29:
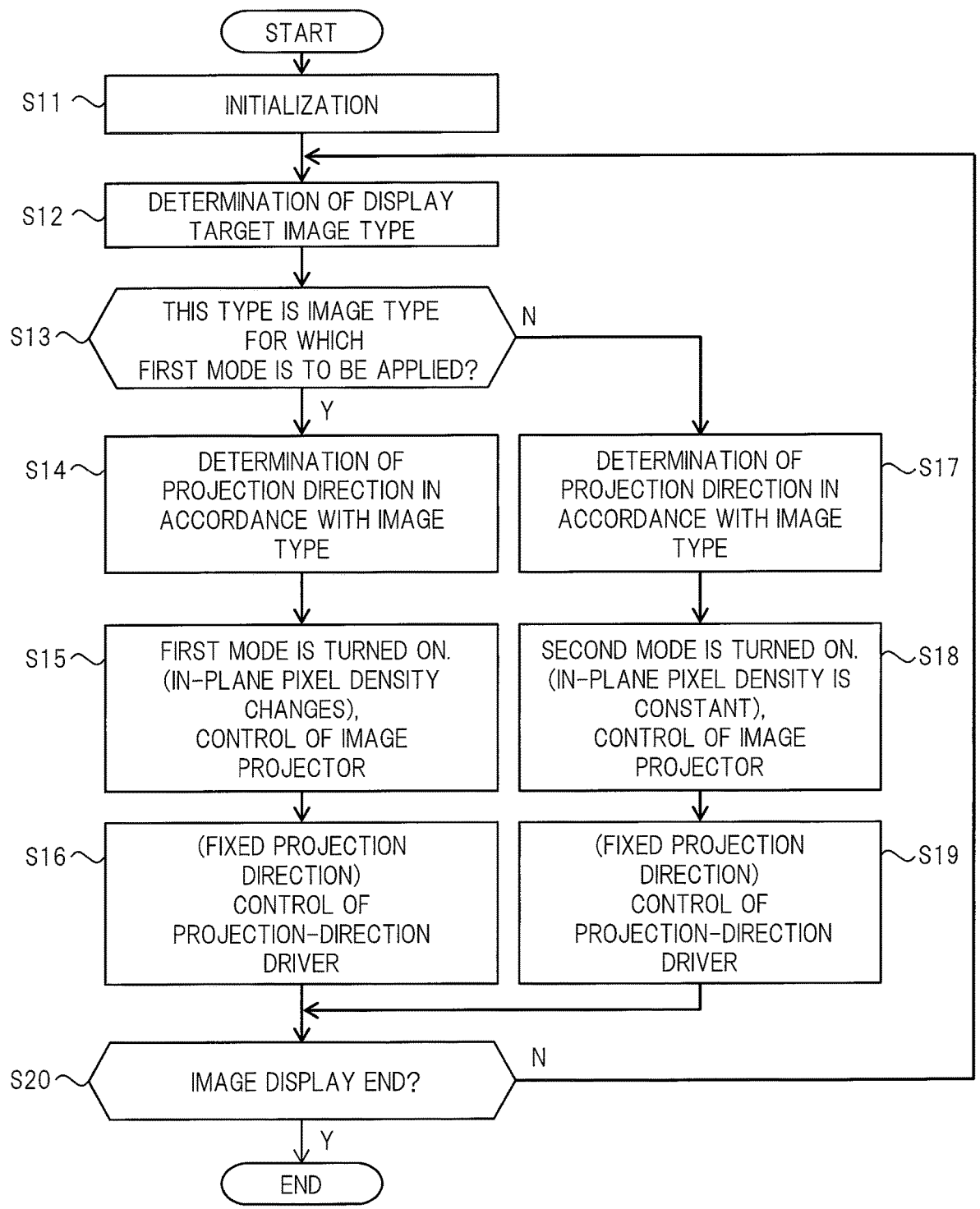
FIG. 29 is a diagram showing a flow of mode switching control in the fifth embodiment.

With reference to FIGS. 28 and 29, an image display apparatus of a fifth embodiment of the present invention will be described. The fifth embodiment is a modification example of the fourth embodiment, and has a unique control function of switching the modes.

FIG. 28(A) shows a display example of a screen 281 in the first mode of the fourth embodiment. On the screen 281, the image of the external environment is similarly transparently displayed. In the first mode of the fifth embodiment, the gaze-direction tracking operation is not performed, and the high-resolution region at the center of the pixel region is fixedly displayed at a predetermined position inside the screen 281, regardless of the gaze direction. In the present example, a display target region 282 is set at a position in vicinity of the center point Q0 inside the screen 281. The display target region 282 is the high-resolution region at the center of the pixel region of the first mode. The image display apparatus controls the projection-direction driver 105 so that the display target region 285 is fixedly set at a predetermined projection angle (projection direction) and in a predetermined range.

Inside the display target region 282, the image information 283 is displayed by an application program of the AR or others. In the present example, the image information 283 is an image related to a map, traffic navigation or others, the image indicating a message such as alert, attention, or notice to the user. This image information 283 is information having high urgency, instantaneousness or significance, that is preferably clearly presented to the user in real time as the image type. Therefore, the display target region 282 for this image information 283 is at a fixed position in vicinity of the center of a front side of the screen 281. Even when the gaze direction of the user is at, for example, the point QX, the image information 283 with the high resolution is displayed in the display target region 282. The fixed position of the display target region 282 that becomes the high-resolution region at the center of the pixel region of the first mode is not limited to the center inside the screen 281, but may be a predetermined position depending on an application program or others.

FIG. 28(B) shows an example in which the image is fixedly displayed at a predetermined position other than portions on the front side as a display example of the screen 281 in the second mode of the fourth embodiment. In the present example, a display target region 284 is fixedly set at a position in vicinity of an upper left portion of the screen 281. The display target region 284 has a constant pixel density in the second mode. Inside the display target region 284, predetermined image information 265 such as the time information or others as similar to that of FIG. 26(B) is displayed. When this image information 265 is presented at the center portion on the front side of the screen 281, the image information 265 is a type of information that tends to be recognized as noises by the user. Therefore, this image information 265 is displayed at a position shifting from the center on the front side.

When the image is displayed on the basis of the gaze-direction tracking of the first mode as described above, the power consumption is necessary for the gaze-direction tracking. In the fifth embodiment, in accordance with the display target image type, the gaze-direction tracking operation is not performed in the first mode so that the projection direction is fixed in a predetermined direction. In this manner, the power consumption can be suppressed.

The image display apparatus of the fourth embodiment determines the display target image type on the basis of the image signal or the information of the application program or others, and determines the projection direction and range to be fixed inside the screen 2, that is, determines the position of the display target image region 282 or others. As the image type, for example, the information having high urgency or significance is set to a first image type, and the information having low urgency or significance is set to a second image type. The first image type may include not only this but also any information or others which the user is intentionally attempting to watch through an operation. The projection direction (display target region) to be fixed can be set in relation to the image type. For example, a first projection direction (such as the center on the front side) is set in the case of the first image type, and a second projection direction (such as an upper left portion) is set in the case of the second image type. The numbers of the image types and the projection directions are not limited to two, and can be variously set.

FIG. 29 shows a flow of the mode switching control in the image display apparatus of the fourth embodiment. FIG. 29 has steps S11 to S20. The steps will be sequentially described below.

In the step S11, the image display apparatus performs initialization when the image presentation starts. In the step S12, the image display apparatus determines the display target image type. In the step S13, the image display apparatus determines whether the first mode is applied or not in accordance with the image type determined in the step S12. If the first mode is to be applied (Y), the step proceeds to the step S13. If the second mode is to be applied (N), the step proceeds to a step S17.

In the step S13, the image display apparatus determines the fixed projection direction (such as the center on the front side) or others in accordance with the image type, and determines the display target region. In the step S14, the image display apparatus turns on the first mode, and controls the image projector 103 so as to provide the pixel configuration of the first mode. In the step S16, the image display apparatus controls the projection-direction driver 105 so as to provide the display target region in the fixed projection direction or others determined in the step S13, that is, so that the center of the display target region has the highest resolution.

In the step S17, the image display apparatus determines the fixed projection direction (such as the upper left portion) in accordance with the image type. In the step S18, the image display apparatus turns on the second mode, and controls the image projector 103 so as to provide the pixel configuration of the second mode. In the step S19, the image display apparatus controls the projection-direction driver 105 so as to provide the display target region in the fixed projection direction or others determined in the step S17.

In the step S20 after the step S16 or S19, the image display apparatus determines whether the image display ends or not. If it is continued, the step returns to the step S12, and the similar control is repeated.

As described above, according to the fifth embodiment, by the high resolution display depending on the image type or others without the gaze-direction tracking operation, lower power consumption is achieved.

In the foregoing, the invention has been concretely described on the basis of the embodiments. However, the present invention is not limited to the foregoing embodiments, and various alterations can be made within the scope of the present invention. The components of the embodiments can be added, removed, separated, synthesized, replaced and combined or others. The numerical values of the specific examples of the embodiments and others are one example. The drawings show part lines as lines connecting the components. Some or all of the functions of the embodiments or others may be achieved by hardware such as an integrated circuit or others, or achieved by software program processing. The software configuring the function of each apparatus or others may be previously stored in the apparatus at the time of the shipping of the product, or may be acquired from an external apparatus through communication after the shipping of the product. The image display apparatuses of the embodiments are not limited to the head mounted type display apparatus, and any application is achieved.

EXPLANATION OF REFERENCE CHARACTERS

1 . . . housing, 3 . . . IC chip, 4 . . . curved mirror, 103 . . . image projector, 105 . . . projection-direction driver, a1 to a3 . . . image light, D1 . . . gaze direction

The invention claimed is:

1. An image display apparatus comprising:
a controller configured to control image projection on a screen;
a circuit unit configured to generate a modulation signal for modulation driving and a scan signal for scan driving on the basis of an image signal as driving control signals for generating image light;
an image projector configured to generate the image light so as to form a pixel on the screen in accordance with a modulation timing by performing the modulation driving for a light source on the basis of the modulation signal, and generate the image light so as to scan the screen while a light emission direction of the image light is changed by performing the scan driving on the basis of the scan signal;
a gaze-direction detector configured to detect a gaze direction of a user onto the screen; and
a driver being an element driving and controlling a slope of the entire image projector or controlling a projection direction of the image light emitted from the image projector, the driver being configured to perform driving to change a projection direction of the image light so as to move an entire pixel region on the screen in accordance with the gaze direction,
wherein, in a first mode of the image projection, the controller controls the modulation driving and the scan driving so that a configuration of a pixel region on the screen changes from a relatively high pixel density region to a relatively low pixel density region in a direction from a center point of the pixel region to an outside, and the controller controls the driver to control the projection direction of the image light so that the center point is matched with a position inside the screen, the position corresponding to the gaze direction, when the position inside the screen corresponding to the gaze direction is not matched with the center point.

2. The image display apparatus according to claim 1, wherein, in the pixel region of the first mode, a characteristic curve indicating change of the pixel density is designed so as to be matched with a characteristic curve indicating change of a density of distribution of retinal photoreceptor cells of an eye.

3. The image display apparatus according to claim 1, wherein, in a second mode of the image projection, the controller controls the modulation driving and the scan driving so that the configuration of the pixel region on the screen is constant in a pixel density, and the driver controls the projection direction of the image light so that the center point is at a constant position inside the screen regardless of the gaze direction.

4. The image display apparatus according to claim 3, wherein the controller performs switching between the first mode and the second mode in accordance with at least one of an image type of the image signal, a device or a program of a generation source of the image signal, detection information of a sensor from external environment, user setting information and user input operation.

5. The image display apparatus according to claim 3, wherein, in a direction from the center point of the pixel region of the second mode to an outside,
a scan speed of the scan driving changes from a first scan speed that is relatively slow to a second scan speed that is relatively fast, and
a modulation speed of the modulation driving changes from a first modulation speed that is relatively slow to a second modulation speed that is relatively fast.

6. The image display apparatus according to claim 3, wherein, in the first mode or the second mode, the controller determines a fixed region where an image is displayed on the screen and a center position of the fixed region in accordance with at least one of an image type of the image signal, a device or a program of a generation source of the image signal, detection information of a sensor from external environment, user setting information and user input operation, and the driver controls the projection direction of the image light.

7. The image display apparatus according to claim 1, wherein the scanning is spiral scanning in a substantially circular region or a substantially ellipsoidal region expanding from the center point to a predetermined maximum value point in a radial direction, and
the pixel region of the first mode is the substantially circular region or the substantially ellipsoidal region.

8. The image display apparatus according to claim 1, wherein the scanning is scanning in a predetermined rectangular region, and
the pixel region of the first mode is the rectangular region.

9. The image display apparatus according to claim 1, wherein, in a direction from the center point of the pixel region of the first mode to an outside,
a scan speed of the scan driving changes from a first scan speed that is relatively slow to a second scan speed that is relatively fast, and
a modulation speed of the modulation driving is constant or changes from a first modulation speed to a second modulation speed.

10. The image display apparatus according to claim 1, wherein, in a direction from the center point of the pixel region of the first mode to an outside,
an interval of the pixel changes.

11. The image display apparatus according to claim 1, wherein, in a direction from the center point of the pixel region of the first mode to an outside,
stepwise arrangement of regions with two or more types of pixel densities having different pixel densities from each other are made.

12. The image display apparatus according to claim 1, wherein, in the first mode, the controller sets a fixed region where an image is displayed on the screen and a center position of the fixed region, sets the center point of the pixel region so as to be matched with the center position of the fixed region, and performs control so as not to perform an operation for matching with the gaze direction.

13. The image display apparatus according to claim 1, wherein the image projector includes:
the light source configured to emit laser light by performing intensity modulation on the basis of the modulation signal;
an optical fiber configured to propagate the laser light and emit the image light; and
a first piezoelectric element arranged around an axis of the optical fiber and configured to change orientation of an end of the optical fiber on the basis of the scan signal.

14. The image display apparatus according to claim 13, wherein the image projector includes:
a second piezoelectric element arranged as the driver around the axis of the optical fiber and configured to be driven by a driving signal on the basis of the gaze direction to change the orientation of the image projector.

15. The image display apparatus according to claim 1, wherein the image display apparatus is a head mounted type display apparatus having an optical system guiding the image light so that the screen is configured in front of a user's eye.

16. An image display method in an image display apparatus comprising the steps of, as steps executed in the image display apparatus:
controlling image projection on a screen, and generating a modulation signal for modulation driving and a scan signal for scan driving as driving control signals for generating image light based on an image signal;
generating the image light so as to form a pixel on the screen in accordance with a modulation timing by performing the modulation driving for a light source on the basis of the modulation signal, and generating the image light so as to scan the screen while a light emission direction of the image light is changed by performing the scan driving on the basis of the scan signal;
detecting a gaze direction of a user onto the screen; and
performing driving so as to change a projection direction of the image light so as to move an entire pixel region on the screen in accordance with the gaze direction by driving and controlling a slope of the entire image projector configured to generate the image light or controlling a projection direction of the image light emitted from the image projector,
wherein, in a first mode of the image projection, the modulation driving and the scan driving are controlled so that a configuration of a pixel region on the screen changes from a relatively high pixel density region to a relatively low pixel density region in a direction from a center point of the pixel region to an outside, and the projection direction of the image light is controlled by the driving step so that the center point is matched with a position inside the screen, the position corresponding to the gaze direction, when the center point is not matched with the position inside the screen.

* * * * *